United States Patent
Sankai

(10) Patent No.: US 12,123,791 B2
(45) Date of Patent: Oct. 22, 2024

(54) HAPTIC DETECTION APPARATUS, HAPTIC DETECTION METHOD, AND ROBOT ARM

(71) Applicant: CYBERDYNE Inc., Tsukuba (JP)

(72) Inventor: Yoshiyuki Sankai, Tsukuba (JP)

(73) Assignee: CYBERDYNE Inc., Ibaraki (JP)

( * ) Notice: Subject to any disclaimer, the term of this patent is extended or adjusted under 35 U.S.C. 154(b) by 415 days.

(21) Appl. No.: 17/611,620

(22) PCT Filed: May 14, 2020

(86) PCT No.: PCT/JP2020/019282
§ 371 (c)(1),
(2) Date: Nov. 16, 2021

(87) PCT Pub. No.: WO2020/230853
PCT Pub. Date: Nov. 19, 2020

(65) Prior Publication Data
US 2022/0244113 A1    Aug. 4, 2022

(30) Foreign Application Priority Data

May 16, 2019    (JP) .................................. 2019-093192

(51) Int. Cl.
*G01L 1/14*    (2006.01)
*B25J 13/08*    (2006.01)
(Continued)

(52) U.S. Cl.
CPC .............. *G01L 1/146* (2013.01); *B25J 13/082* (2013.01); *B25J 15/08* (2013.01); *G01L 5/228* (2013.01); *G06F 3/0445* (2019.05)

(58) Field of Classification Search
CPC ........ G01L 1/146; G01L 5/228; B25J 13/082; B25J 15/08; G06F 3/0445
See application file for complete search history.

(56) References Cited

U.S. PATENT DOCUMENTS

| 8,499,651 B2 * | 8/2013 | Kishida .................. G01L 1/146 |
| | | 73/862.391 |
| 11,260,530 B2 * | 3/2022 | Sankai .................. B25J 9/1633 |

(Continued)

FOREIGN PATENT DOCUMENTS

| EP | 2824549 A1 * | 1/2015 | ............. G01L 1/146 |
| JP | 05-288619 A | 11/1993 | |

(Continued)

OTHER PUBLICATIONS

EP-2824549-A1 English Translation (Year: 2015).*

(Continued)

*Primary Examiner* — Ryan D Walsh
(74) *Attorney, Agent, or Firm* — Volpe Koenig

(57) ABSTRACT

A haptic detection apparatus includes: a capacitance detection unit that detects capacitance of each of capacitors which changes according to an external force applied to a second electrode plate of a capacitance-type load sensor; a distributed load measurement unit that measures a distributed load indicating a distribution of load applied to each of the cylinders on the basis of a change amount of the capacitance of each capacitor which is detected by the capacitance detection unit; and a load information calculation unit that calculates a total load and a load center position of the external force applied to the second electrode plate of the load sensor on the basis of a relation between an expansion/contraction amount of each cylinder relative to the distributed load measured by the distributed load measurement unit and a pattern of the distributed load.

7 Claims, 19 Drawing Sheets

(51) Int. Cl.
*B25J 15/08* (2006.01)
*G01L 5/22* (2006.01)
*G06F 3/044* (2006.01)

(56) References Cited

U.S. PATENT DOCUMENTS

| | | |
|---|---|---|
| 2010/0033196 A1 | 2/2010 | Hayakawa et al. |
| 2010/0271328 A1* | 10/2010 | Sekiguchi ............. G06F 3/0445 |
| | | 345/174 |
| 2013/0191057 A1 | 7/2013 | Ben Shalom et al. |
| 2016/0015311 A1 | 1/2016 | Jiang |

FOREIGN PATENT DOCUMENTS

| | | |
|---|---|---|
| JP | 2009-069028 A | 4/2009 |
| JP | 2010-043881 A | 2/2010 |
| JP | 4756097 B1 | 8/2011 |
| JP | 2013-522588 A | 6/2013 |
| JP | 2014-142193 A | 8/2014 |
| WO | 2014/068269 A1 | 5/2014 |

OTHER PUBLICATIONS

International Search Report, PCT/JP2020/019282, Aug. 11, 2020, 2 pgs.
Extended European Search Report dated Jan. 2, 2023 for European Patent Application No. 20805501.2.

\* cited by examiner

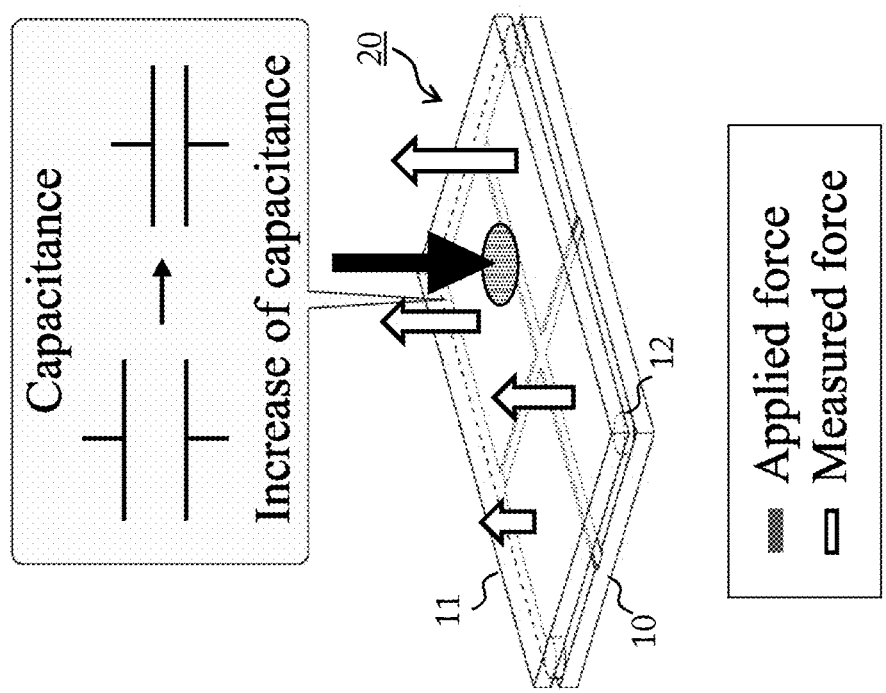
FIG. 1C
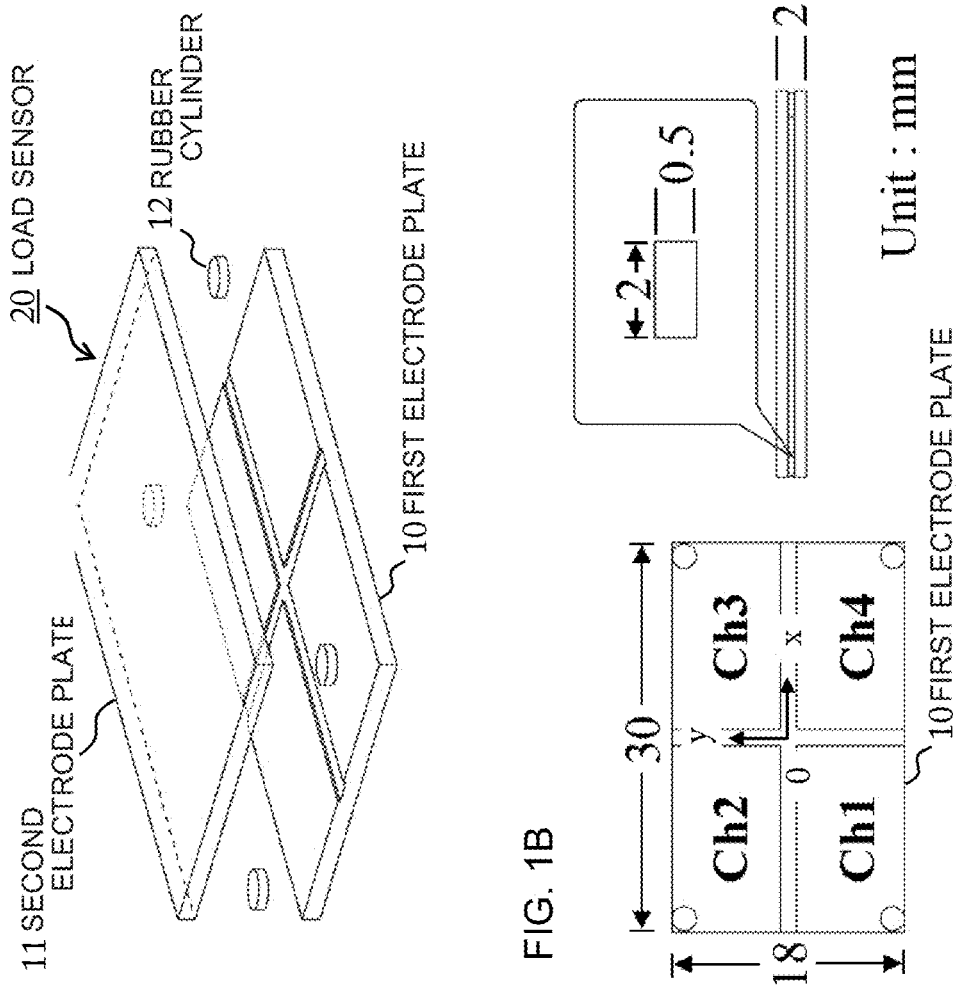
FIG. 1A
FIG. 1B

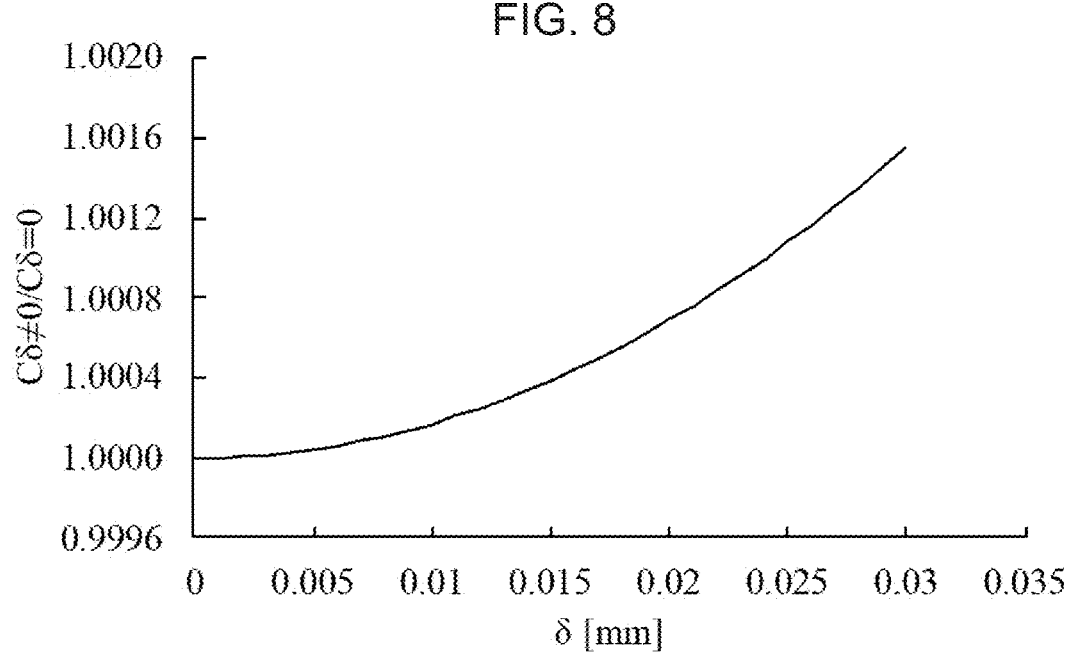

HAPTIC DETECTION APPARATUS, HAPTIC DETECTION METHOD, AND ROBOT ARM

TECHNICAL FIELD

The present invention is suited for application to a haptic detection apparatus, a haptic detection method, and a robot arm which are capable of feeding back haptic information.

BACKGROUND ART

There is a demand for robots to work with people or work instead of people at various scenes such as job sites of service industry and welfare services. These robots need to hold various items for daily use existing at life scenes by using their robot arms with appropriate force and at fingertip positions according to their respective stiffness and shapes.

In order for a robot arm to hold an object with appropriate force, it is necessary to control a gripping force while receiving the feedback of a contact pressure between fingertips and the object as haptic information. Furthermore, in order for the robot arm to judge whether the object is successfully held at the appropriate fingertip positions or not, it is necessary to recognize with which positions of the fingertips the object is in contact, on the basis of the contact positions between the fingertips and the object. Accordingly, the robot needs to be equipped with a haptic sensor capable of detecting information about the contact pressure and the contact positions at the fingertips of the robot arm.

Furthermore, in order to use the robot(s) at the life scenes, the robot(s) is required to work in the same environment at the same time as a person(s) without interrupting with the work environment or narrowing a work area. When a person actually performs the work, these requirements are satisfied; and, therefore, if the robot arm is of a size close to the size of a human arm, such requirements would be similarly satisfied. Accordingly, the haptic sensor needs to be designed with the size which allows the haptic sensor to be incorporated into finger parts of the robot arm.

Regarding conventional haptic sensors, there is research relating to a method for measuring two-dimensional distributed load and its center position by using pressure-sensitive conductive elastomers. The method using elastomers, resins, and so on as pressure-sensitive conductive materials has the advantage of being capable of realizing a sensor with high flexibility.

Regarding conventional technology documents, there is proposed a capacitance-type surface pressure distribution sensor capable of detecting, for example, an uneven shape of an object to be measured as a surface pressure distribution on the basis of changes in the capacitance (see PTL 1). Moreover, there is proposed an input apparatus for detecting either a pressing direction or pressing strength, or both of them, according to changes in the capacitance when a thin resin film base on which capacitance detecting electrodes are formed is pressed at an arbitrary position (see PTL 2). Furthermore, there is proposed a load distribution detection apparatus equipped with a capacitance-type surface pressure distribution sensor capable of detecting a load distribution by detecting the size of the load at each position (see PTL 3).

CITATION LIST

Patent Literature

PTL 1: Japanese Patent Application Laid-Open (Kokai) Publication No. 2010-43881

PTL 2: Japanese Patent No. 4756097

PTL 3: Japanese Patent Application Laid-Open (Kokai) Publication No. 2014-142193

SUMMARY OF THE INVENTION

Problems to be Solved by the Invention

However, each one of the above-mentioned PTL 1 to PTL 3 is characterized in that the relation between the pressure and the resistance of the pressure-sensitive conductive materials which are made of elastomers and/or resins does not become linear; and, therefore, even with the same load, the larger the area on which the load acts becomes, the larger a reduced amount of a resistance value becomes.

Since there are various shapes of daily use items existing in the life scenes, a contact area of a finger surface in contact with a daily use item when holding the item is not constant. Therefore, the haptic sensor for robots, which can be used in the life scenes, is required to be capable of accurately measuring the size of the applied load regardless of the area on which the load acts.

The present invention was devised in consideration of the above-described circumstances and proposes a haptic detection apparatus, a haptic detection method, and a robot arm which are capable of accurately measuring the size of the externally applied load regardless of the area on which the load acts.

Means to Solve the Problems

In order to solve the above-described problems, there is provided according to the present invention a haptic detection apparatus configured to include: a capacitance-type load sensor that forms a plurality of capacitors by inserting the same number of specified-shape cylinders, each of which is composed of a viscoelastic body, as the number of a plurality of positive electrodes of a first electrode plate, respectively between the first electrode plate on which the plurality of positive electrodes are disposed in the same plane and in an array shape, and a second electrode plate on which a single negative electrode is disposed; a capacitance detection unit that detects capacitance of each of the capacitors which changes according to an external force applied to the second electrode plate of the load sensor; a distributed load measurement unit that measures a distributed load indicating a distribution of load applied to each of the cylinders on the basis of a change amount of the capacitance of each capacitor which is detected by the capacitance detection unit; and a load information calculation unit that calculates a total load and a load center position of the external force applied to the second electrode plate of the load sensor on the basis of a relation between an expansion/contraction amount of each cylinder relative to the distributed load measured by the distributed load measurement unit and a pattern of the distributed load.

As a result, the distributed load applied to each cylinder is uniquely determined according to the total load and the load center position of the external force applied to the second electrode plate of the load sensor, so that the size of the externally applied load can be measured accurately regardless of the planar dimension of the load which acts on the second electrode plate.

Moreover, according to the present invention, regarding each capacitor, the capacitance detection unit calibrates and corrects a response lag according to a measurement error of the load applied to the cylinder according to material characteristics of the relevant cylinder, and hardness of the cylinder on the basis of an increase amount of the capacitance until an elapse of a specified amount of time after the application of the load.

As a result, the response lag occurs attributable to gradual plastic deformation, which occurs after instantaneous elastic deformation, of the cylinder(s) which is the viscoelastic body, so that: the response lag becomes larger in proportion to a low level of the hardness; and as the hardness becomes lower, the expansion/contraction amount of the cylinder relative to the load increases and the distance between the electrode plates becomes shorter and, therefore, the capacitance which has an inverse proportion relation with the distance between the electrode plates becomes larger. So, the increase amount of the capacitance becomes larger in proportion to the low level of the hardness, but such factors based on the material characteristics can be solved.

Furthermore, according to the present invention, the load information calculation unit calculates an error compensation amount for an uneven load, which causes the load center position to become outside a center of the second electrode plate, on the basis of the total load of the external force applied to the second electrode plate of the load sensor, a ratio of the distributed load in an x-axis direction of the first electrode plate as a plane surface, and a ratio of the distributed load in a y-axis direction of the first electrode plate as the plane surface and calibrates and corrects the load center position on the basis of the error compensation amount.

As a result, the error compensation amount can be calculated by means of simulation also with respect to the uneven load which causes the load center position to become outside the center of the second electrode plate, and the load center position can be calibrated and corrected at the same time as the correction of the size error of each first electrode plate.

Furthermore, according to the present invention, the load sensor is entirely coated with a shielding material which is made of a non-conducting material. As a result, it is possible to prevent the formation of a capacitor from the sensor itself and other dielectric substances and eliminate exogenous noise.

Furthermore, there is provided according to the present invention a haptic detection method with a capacitance-type load sensor configured to form a plurality of capacitors by inserting the same number of specified-shape cylinders, each of which is composed of a viscoelastic body, as the number of a plurality of positive electrodes of a first electrode plate, respectively between the first electrode plate on which the plurality of positive electrodes are disposed in the same plane and in an array shape, and a second electrode plate on which a single negative electrode is disposed, wherein the haptic detection method includes: a first step of detecting capacitance of each of the capacitors which changes according to an external force applied to the second electrode plate of the load sensor; a second step of measuring a distributed load indicating a distribution of load applied to each of the cylinders on the basis of a change amount of the capacitance of each capacitor which is detected in the first step; and a third step of calculating a total load and a load center position of the external force applied to the second electrode plate of the load sensor on the basis of a relation between an expansion/contraction amount of each cylinder relative to the distributed load measured in the second step and a pattern of the distributed load.

As a result, the distributed load applied to each cylinder is uniquely determined according to the total load and the load center position of the external force applied to the second electrode plate of the load sensor, so that the size of the externally applied load can be measured accurately regardless of the planar dimension of the load which acts on the second electrode plate.

Furthermore, according to the present invention, a robot arm is configured to incorporate the haptic detection apparatus into its fingertips for holding an object so that the second electrode plate of the load sensor becomes a holding surface of the fingertips. As a result, when the robot arm holds the object, a contact pressure and contact positions of the fingertips can be recognized accurately.

Advantageous Effects of the Invention

The present invention as described above can implement the haptic detection apparatus, the haptic detection method, and the robot arm which are capable of accurately measuring the size of the externally applied load regardless of the planar dimension on which the load acts.

BRIEF DESCRIPTION OF DRAWINGS

FIGS. 1A-1C are conceptual diagrams illustrating the configuration of a load sensor in a haptic detection apparatus according to this embodiment;

FIG. 8 is a graph indicating a fluctuation coefficient of capacitance according to increase amounts of a center-to-center distance and the inclination of the second electrode plate;

DESCRIPTION OF EMBODIMENTS

Figure 2:
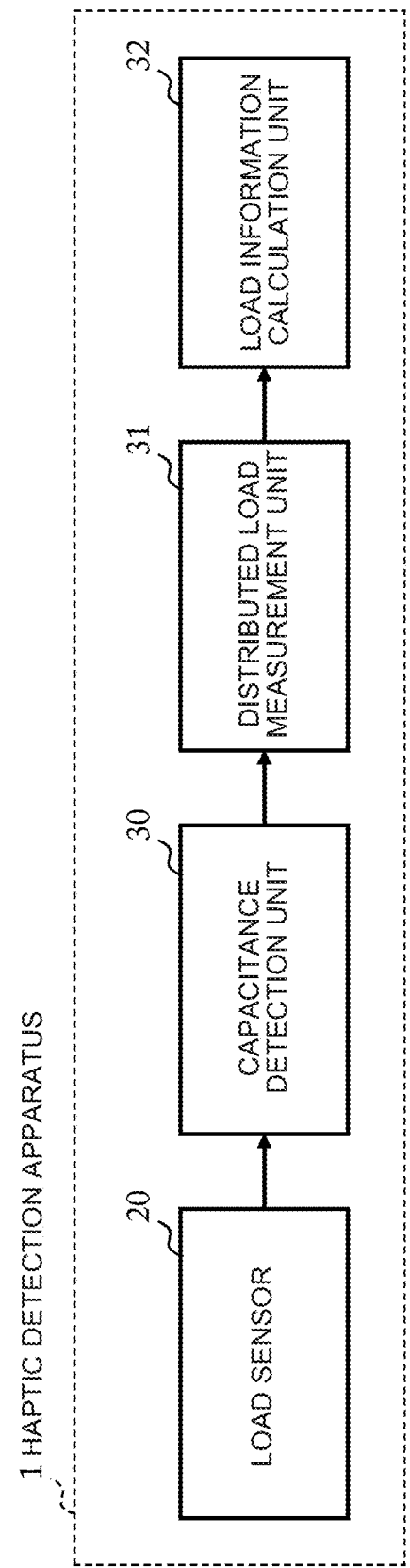
FIG. 2 is a block diagram illustrating an internal configuration of the haptic detection apparatus illustrated in FIG. 1.

An embodiment of the present invention will be described below in detail with reference to the drawings.

(1) Configuration of Haptic Detection Apparatus According to this Embodiment FIG. 1A to FIG. 1C illustrate a haptic detection apparatus 1 according to this embodiment. The haptic detection apparatus 1 includes a capacitance-type load sensor 20 which forms a plurality of capacitors by inserting the same number of rubber cylinders 12 of a specified shape as spacers, each of which is composed of a viscoelastic body, as the number of a plurality of positive electrodes of a first electrode plate 10, respectively between the first electrode plate 10 on which the plurality of positive electrodes are disposed in the same plane and in an array shape, and a second electrode plate 11 on which a single negative electrode is disposed.

The size of the load sensor 20 is set by assuming that finger parts of a robot arm (not shown in the drawings) are formed as a 2-link mechanism. Regarding the size of the second electrode plate 11 in the load sensor 20, its long side is 30 [mm], its short side is 18 [mm], and its thickness is 2.3 [mm]; and the rubber cylinder 12 has a diameter of 2 [mm] and a height of 0.5 [mm].

When a load is applied to the second electrode plate 11 of the load sensor 20, the rubber cylinders 12 which are the spacers contract, the distance between the first electrode plate 10 and the second electrode plate 11 becomes shorter, and the capacitance of the capacitor configured between the first electrode plate 10 and the second electrode plate 11 increases. Under this circumstance, the load applied to the first electrode plate 10 causes each rubber cylinder 12 to contract or expand according to the size of the load and a load center position, regardless of the planar dimension on which the load acts. An expansion/contraction amount of each rubber cylinder 12 and its pattern are uniquely determined according to the applied load and its load center position.

Therefore, by converting an increase amount of the measured capacitance into the load, the load applied to the second electrode plate 11 of the load sensor 20 can be measured as a load distribution formed of four forces against the first electrode plate 10, regardless of its contact area; and this load distribution makes it possible to calculate a total load applied to the load sensor 20, and its load center position. As the distance between the electrodes is shorter, the capacitance appears as a large change (increase). So, the load sensor 20 which is highly sensitive and is of a thin type is appropriate for implementation.

Furthermore, the load sensor 20 is structured to increase the expansion/contraction amount of the rubber cylinders 12 and enhance sensitivity of the sensor by concentrating the load on the rubber cylinders 12 disposed at four corners of the load sensor 20. Incidentally, silicone rubber which has excellent weather resistance, heat resistance, and cold resistance is used as a material for the rubber cylinder 12.

As a measure against noise, the entire load sensor 20 is shielded and its back side is equipped and shielded with a measurement circuit. Consequently, the load sensor 20 is formed as a small-sized haptic sensor module capable of eliminating exogenous noise by preventing the formation of a capacitor between the first electrode plate 10 and the second electrode plate 11 and other dielectric substances and outputting ND-converted values in the vicinity of the first electrode plate 10 and the second electrode plate 11.

Incidentally, a load measurement range of the load sensor 20 is set in consideration of a gripping force which is required to hold daily use items in life scenes. According to the analysis of daily life using the International Classification of Functioning, Disability, and Health (ICF), it is reported that actions to lift an item which weighs 400 [g] or more are approximately 10% of actions to lift items in daily life. Therefore, it is possible to assume that approximately 90% of the daily life can be covered if the items of 400 [g] can be lifted.

Furthermore, it is reported that a minimum value of a human finger's friction coefficient is 0.5 and a force of approximately 1.4 times as large as the minimum required force is exhibited when a person holds an object. Accordingly, the load sensor 20 needs to measure weights up to 560 [g] (=5.488 [N]). Therefore, the load measurement range is set as 0 to 596.7 [g] (=0 to 5.848 [N]) to exceed the above value.

(2) Internal Configuration of Haptic Detection Apparatus 1 According to this Embodiment Referring to FIG. 2, the internal configuration of the haptic detection apparatus 1 illustrated in FIG. 1 will be explained. In the haptic detection apparatus 1, a capacitance detection unit 30 detects the capacitance of each capacitor which changes according to an external force applied to the second electrode plate 11 of the load sensor 20.

A distributed load measurement unit 31 measures a distributed load indicating a distribution of the load applied to each rubber cylinder 12 on the basis of a change amount of the capacitance of each capacitor detected by the capacitance detection unit 30. A load information calculation unit 32 calculates a total load and a load center position of an external force applied to the second electrode plate 11 of the load sensor 20 on the basis of the relation between an expansion/contraction amount of each rubber cylinder 12 relative to the distributed load measured by the distributed load measurement unit 31, and a pattern of the distributed load.

Moreover, the capacitance detection unit 30 is designed as described later to calibrate and correct, with respect to each capacitor, a response lag according to a measurement error of the load applied to the rubber cylinder 12 according to material characteristics of the relevant cylinder, and hardness of the rubber cylinder 12 on the basis of an increase amount of the capacitance until the elapse of a specified amount of time after the application of the load.

Furthermore, the load information calculation unit 32 is designed as described later to calculate an error compensation amount for an uneven load, which causes the load center position to become outside the center of the second electrode plate 11, on the basis of the total load of the external force applied to the second electrode plate 11 of the load sensor 20, a ratio of the distributed load in an x-axis direction of the first electrode plate 10 as a plane surface, and a ratio of the distributed load in a y-axis direction of the first electrode plate 10 as the plane surface and calibrate and correct the load center position on the basis of the error compensation amount.

(3) Basic Characteristics and Even Load Measurement Method of Haptic Detection Apparatus 1 According to the Present Invention An explanation will be provided about the responsiveness and the size of the sensor output (the increase amount of the capacitance) when the load is applied to the center of each sensor (the center of the second electrode plate 11) with respect to three types of load sensors 20 manufactured by using silicone rubber with the hardness, which indicates the degree of hardness, of 20°, 50°, and 80° for the rubber cylinders 12 as basic characteristics of the haptic detection apparatus 1 according to this embodiment; and the calibration of the even load measurement will be also explained.

Figure 3:
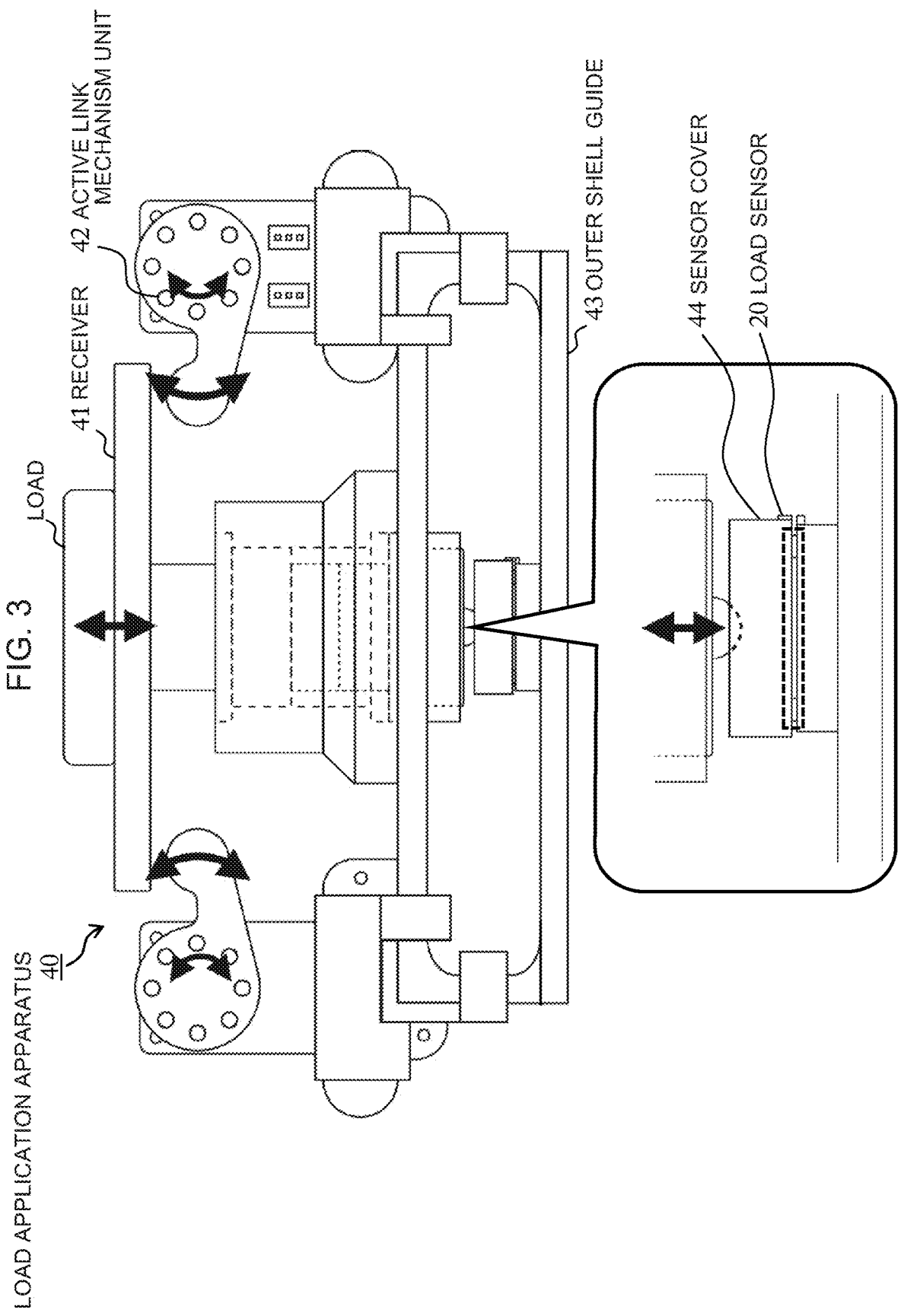
FIG. 3 is a schematic diagram illustrating an internal configuration of a load application apparatus.

FIG. 3 illustrates a load application apparatus 40. This load application apparatus 40 is configured of a receiver 41 for the load, an active link mechanism unit 42 which supports the receiver 41, an outer shell guide 43, and a sensor cover 44. Up and down actions of the active link mechanism unit 42 which supports both ends of the load receiver 41 make it possible to apply or eliminate the load at arbitrary time. Regarding the load placed on the receiver 41, only a vertical load (press-down force) is transmitted by the outer shell guide 43 to the load sensor 20 of the haptic detection apparatus 1. The positions on which the load acts are matched by engagement between a recess of the sensor cover 44 and a protrusion of a receiver shaft tip. By adjusting the recess position of the sensor cover 44, it is possible to apply the load to the load sensor 20 at an arbitrary position.

(3-1) Responsiveness of Sensor Output of Load Sensor 20

Figure 4:
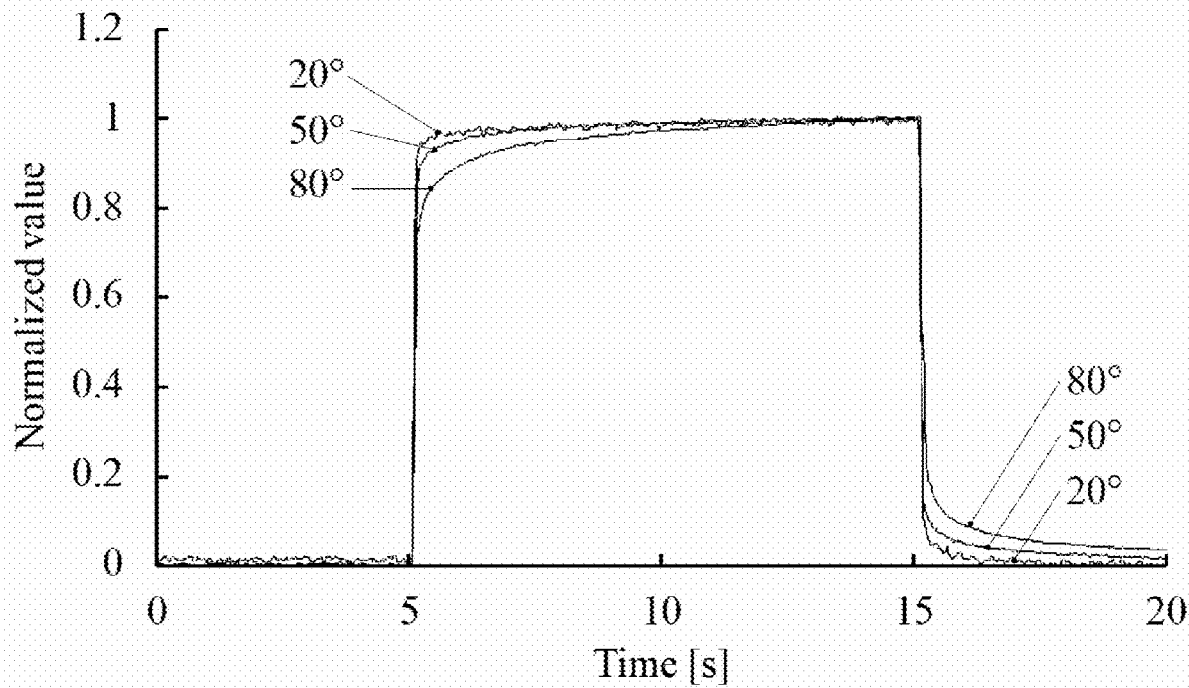
FIG. 4 is a graph indicating a comparison of response characteristics when applying a load to center positions of three types of load sensors.

FIG. 4 illustrates normalized results of outputs from Channel 1 (one of four first electrode plates 10) of the load sensor 20 when the load of 5.848 [N] was applied at the center position of each load sensor 20 for 10 seconds. It was confirmed based on these results that a response lag according to the hardness of the silicone rubber exists with the load sensor 20. Since the silicone rubber used as the rubber cylinder 12 is a viscoelastic body under this circumstance, gradual plastic deformation occurs after instantaneous elastic deformation. This plastic deformation is the cause of the response lag illustrated in FIG. 4; and you can see that as the rubber hardness is lower, the response lag becomes larger.

Since the evaluation was conducted under more severe conditions in this embodiment, a change amount of the sensor output per unit time as caused by the response lag became large. Characteristic verification and calibration are conducted by using values obtained one second after the application of the load.

(3-2) Characteristics of Capacitance Relative to Load

Figure 5:
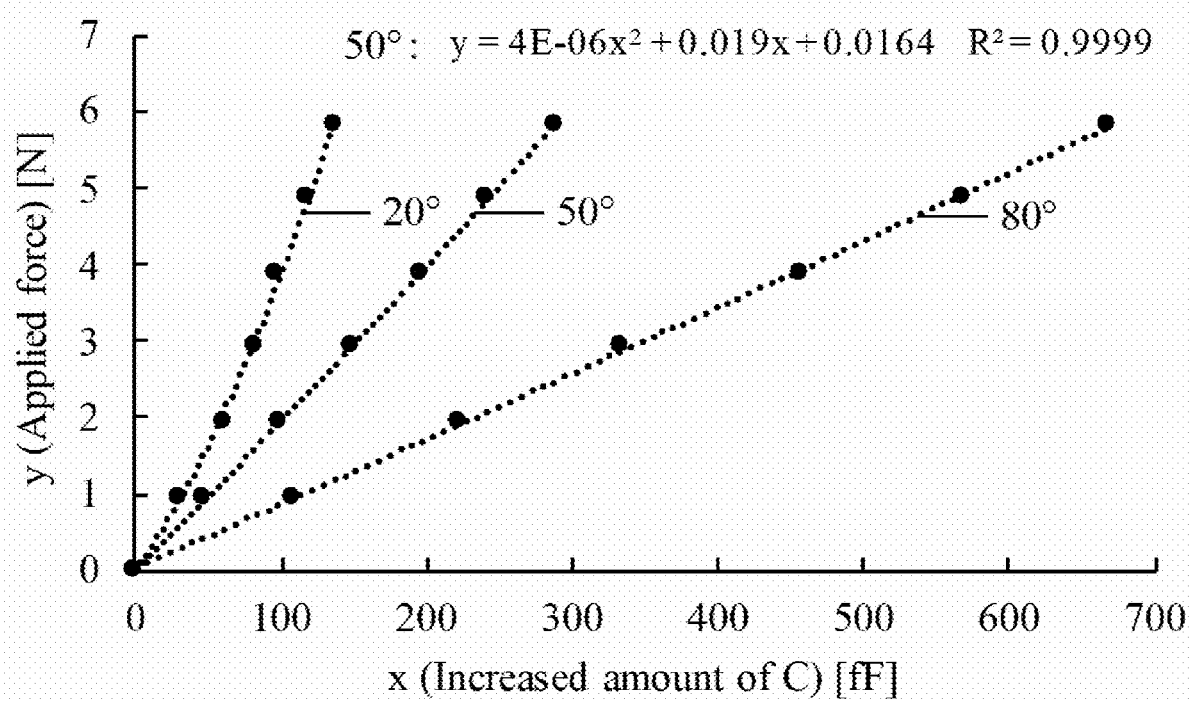
FIG. 5 is a graph indicating the relation between a sensor output one second after the load application, and the load.

FIG. 5 illustrates the relation between the sensor output one second after the load application, and the load. Incidentally, the load of 0 to 596.7 [g] is applied to the center position of the load sensor 20; and when and after the load becomes equal to or more than 96.7 [g], which is the weight of the load receiver of the load application apparatus, the load is increased by 100 [g] each time by adding counterweights; and five trials are conducted for the load application with respect to each load.

FIG. 5 shows that as the rubber hardness of the rubber cylinder 12 becomes lower, the increase amount of the capacitance of the load sensor 20 becomes larger. This is because: as the rubber hardness becomes lower, the expansion/contraction amount of the rubber cylinder 12 relative to the load increases and the distance between the first electrode plate 10 and the second electrode plate 11 becomes shorter; and, therefore, the capacitance which has an inverse proportion relation with the distance between the first electrode plate 10 and the second electrode plate 11 becomes larger. Consequently, attention will be focused on the load sensor 20 with the rubber hardness 50[°], which was used to position the responsiveness and the sensor output among the three types of the load sensors 20, and the measurement characteristics will be checked and the calibration will be conducted.

(3-3) Calibration of Even Load Measurement

The calibration for the even load measurement of Channel 1 of the load sensor 20 is conducted by finding an approximate formula which represents a correlation from the plot of the load and the sensor output as illustrated in FIG. 5, and using it for conversion between the sensor output and the load. Accordingly, the correction of size errors of the first electrode plate 10 and the second electrode plate 11 is conducted at the same time. Similarly, the calibration of other channels is also conducted. This time, high similarity was confirmed by a monotonically increasing quadratic curve within a response range for the applied load. Incidentally, a coefficient of determination $R^2$ was 0.999 or more with respect to all the channels.

The total load Fa applied to the sensor is calculated according to the following Expression (1) as the sum of values obtained by dividing the load $F_{chn}$ (n=1 to 4) measured by each channel of the sensor by 4.

[Math. 1]

$$F_a = \frac{1}{4}(F_{ch1} + F_{ch2} + F_{ch3} + F_{ch4}) \tag{1}$$

(4) Measurement Characteristics and Error Compensation Regarding Uneven Load

Subsequently, regarding a case of an uneven load where the load center position becomes outside the center of the load sensor 20, an explanation will be provided about the necessity to check the characteristics of the sensor output regarding the uneven load and the error compensation in the load measurement. Then, regarding the calibration for the uneven load measurement, an explanation will be provided about derivation of an error compensation formula for the measured load by means of simulation, and its application to the actual sensor.

(4-1) Characteristics of Sensor Output Relative to Uneven Load

The characteristics of the sensor output when the uneven load is applied to the load sensor 20 will be examined from two points of view, that is, material characteristics of the rubber cylinder(s) 12 and electrical characteristics of the capacitor(s). Firstly, an explanation will be provided about the influence caused by the material characteristics of the rubber cylinder 12 when the uneven load is applied.

Figure 6:
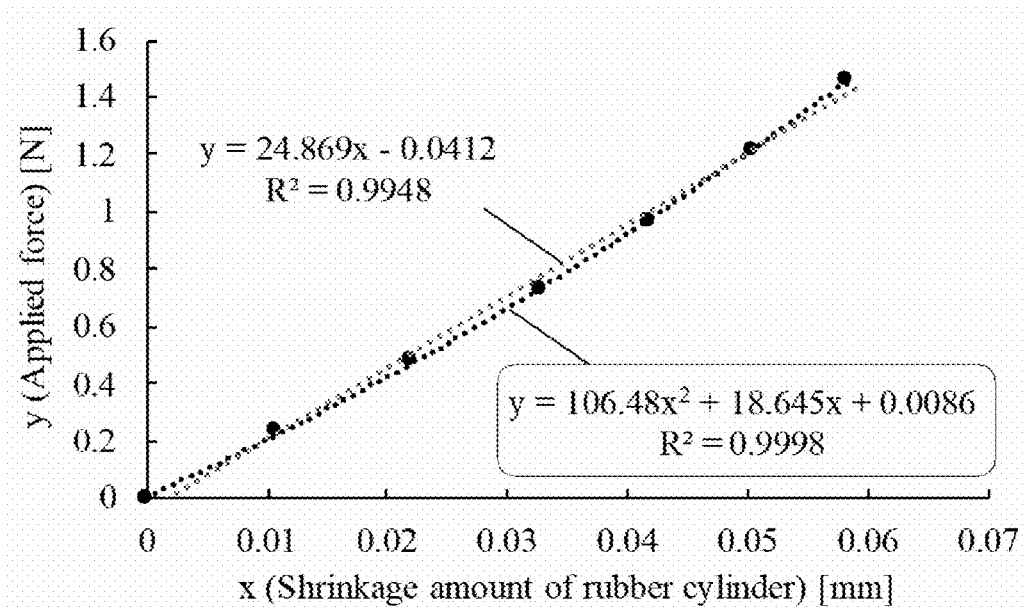
FIG. 6 is a graph indicating the relation between an expansion/contraction amount of a rubber cylinder and the load.

The relation between the expansion/contraction amount of the rubber cylinder(s) 12 and the load as illustrated in FIG. 6 was calculated based on the relation between the sensor output and the load as illustrated in FIG. 5 which was confirmed with the aforementioned actual sensor. Incidentally, when the load is applied to the center position of the sensor, the load applied to one rubber cylinder 12 becomes a quarter of the total load. Regarding the material characteristics of common rubber materials including the silicone rubber, the relation between the expansion/contraction amount and the load becomes non-linear. Referring to FIG. 6, regarding the relation between the expansion/contraction amount of the rubber cylinder 12 and the load within the response range for the load applied this time, high similarity was confirmed by a monotonically increasing quadratic curve. Incidentally, the coefficient of determination $R^2$ was 0.999 or more.

Referring to FIG. 6, since the coefficient has a positive non-linear quadratic term when an input variable is the expansion/contraction amount and an output is the load, the total sum of the expansion/contraction amount of the rubber cylinders 12 relative to the load becomes smaller with the uneven load, where the load is concentrated on part of the rubber cylinders 12, as compared to the even load. Since the capacitance is inversely proportional to the distance between the electrode plates, the influence caused by the material characteristics of the rubber cylinder(s) 12 is that, in the case of the uneven load, as the load center becomes farther away from the center of the sensor, the sensor output becomes smaller than that of the even load.

Figure 7:
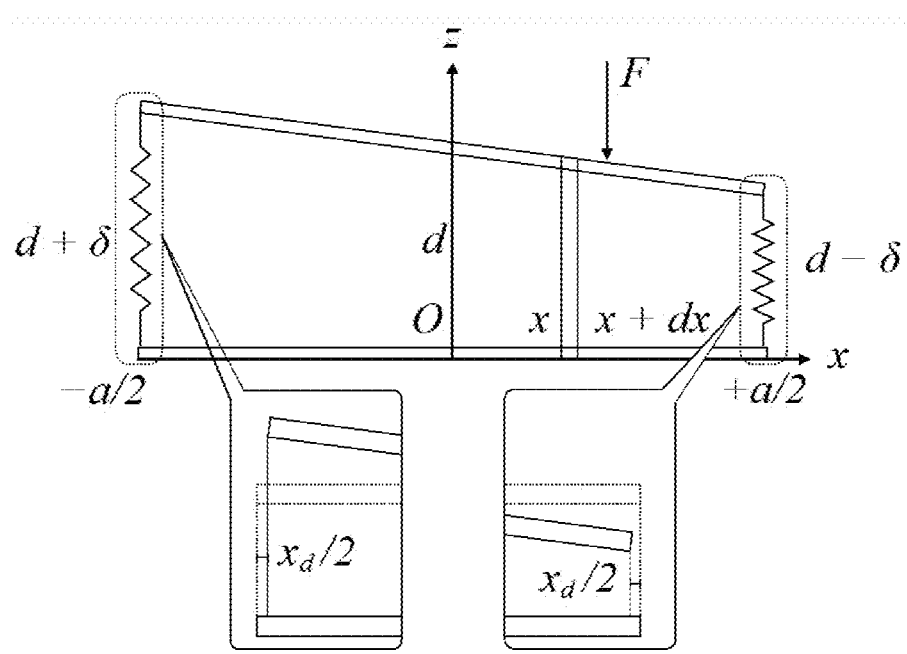
FIG. 7 is a schematic diagram illustrating a sectional view of a capacitor when an inclination δ in an x-axis direction has occurred in a second electrode plate.

Next, an explanation will be provided about the influence caused by the electrical characteristics when the uneven load is applied. When the uneven load is applied, an inclination occurs in the second electrode plate 11 of the load sensor 20. So, as a simple sensor model when the uneven load is applied, FIG. 7 illustrates a sectional view of the capacitor in the case where an x-axis direction inclination δ has occurred in the second electrode plate 11. Under this circumstance, it is assumed that the rubber cylinders 12 at both ends are linear springs in order to check only the influence caused by the electrical characteristics.

Referring to FIG. 7, the entire capacitance can be replaced with a set of micro capacitors with the width dx in the drawing and the distance z between the electrode plates. Since the distance z between the electrode plates changes linearly relative to the x-axis direction, it becomes $z=d-(2\delta/a)x$. Under this circumstance, the capacitance dC of the micro capacitor is expressed by the following expression (2).

[Math. 2]

$$dC = \frac{\varepsilon\varepsilon_0 b dx}{d - (2\delta/a)x} \quad (2)$$

In the above expression, ε represents a relative dielectric constant of air, ε0 represents a dielectric constant in vacuum, a represents a long side of the sensor, and b represents a short side of the sensor. Furthermore, an x-axis direction length xd of an electrode plate edge capacitor which is reduced by the inclination is expressed by the following Expression (3).

[Math. 3]

$$x_d = a - \sqrt{a^2 - 4\delta^2} \quad (3)$$

Therefore, the entire capacitance C is calculated according to Expression (4).

[Math. 4]

$$C(x) = \int_{-(\frac{a}{2} - \frac{x_d}{2})}^{\frac{a}{2} - \frac{x_d}{2}} \frac{\varepsilon\varepsilon_0 b dx}{d - (2\delta/a)x} \quad (4)$$

Regarding the influence caused by the electrical characteristics when the inclination has occurred in the second electrode plate 11, the influence of the same tendency occurs regardless of the size of the applied load. An explanation will be provided below about the case where the maximum load is applied where the above-mentioned influence appears particularly prominently. Referring to FIG. 6, the expansion/contraction amount of the rubber cylinder 12 when the maximum load 5.848 [N] within the measurement range of the defined load was applied to the center of the sensor as described earlier was approximately 0.06 [mm].

In the case of the uneven load at the load sensor 20, the response when applying the maximum load which causes the largest inclination of the second electrode plate 11 was checked by simulation of the simple sensor model as illustrated in FIG. 7. As a result, a fluctuation coefficient $C_{\delta\neq0}/C_{\delta=0}$ of the capacitance when the center-to-center distance d of the second electrode plate 11 was increased to 0.44 [mm] and the inclination δ was increased from 0 [mm] to 0.03 [mm] was indicated as illustrated in FIG. 8. Incidentally, $C_{\delta=0}$ is the capacitance when the inclination δ is 0 [mm]; and $C_{\delta\neq0}$ is the capacitance when the inclination δ is not 0 [mm]. Referring to FIG. 8, it was successfully confirmed that regarding the electrical characteristics, as the inclination is larger, the sensor output becomes larger.

Accordingly, in order to measure the uneven load accurately, it is necessary to perform the compensation in consideration of the influences caused by the material characteristics of the rubber cylinders 12 and the electrical characteristics of the capacitors. So, a simulator is created based on the created actual sensor, an error compensation formula for the load measurement is derived from the simulation result, and this formula is applied to the actual sensor.

(4-2) Derivation of Error Compensation Formula by Simulation

Figure 9A:
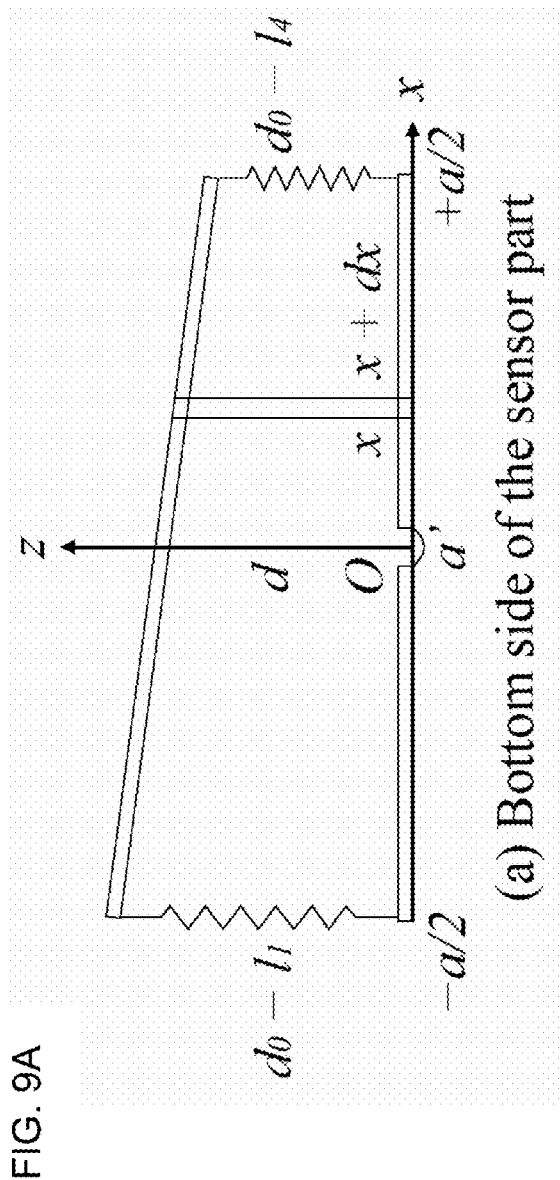
FIGS. 9A and 9B are conceptual diagrams illustrating a simulation model of the load sensor when an uneven load is applied.
Figure 9B:
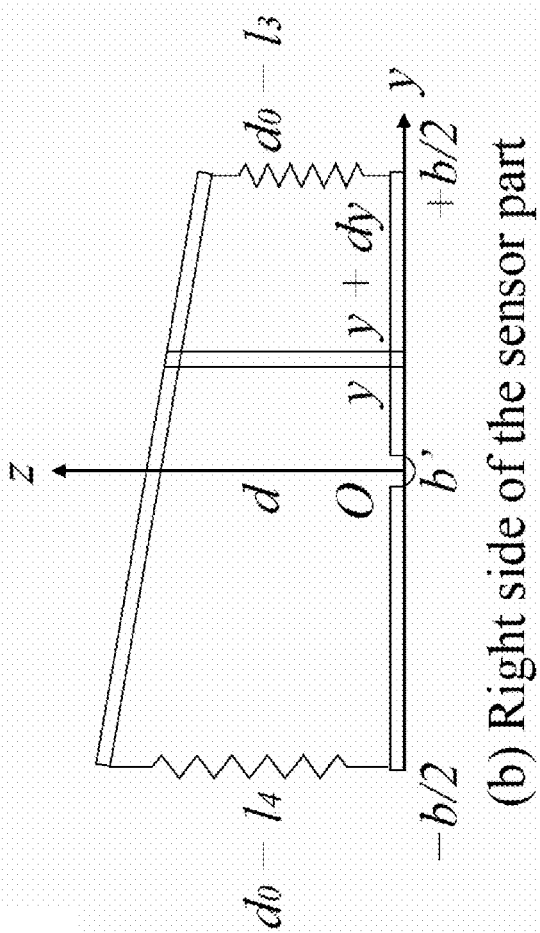

The measurement characteristics for the uneven load are checked and the error compensation formula for the load measurement is derived by means of the simulation. FIG. 9A illustrates a bottom side view and FIG. 9B illustrates a right side view of the case where the inclination has occurred in the second electrode plate 11 as a model of the load sensor 20 when the uneven load is applied. Incidentally, do is a natural length of the rubber cylinder 12 and $I_n$ (n=1 to 4) is expressed as the following Expression (5) as the inclination in the y-axis direction is added to Expression (3).

[Math. 5]

$$C_n(x) = \int\int \frac{\varepsilon\varepsilon_0 dxdy}{d - (2\delta_x/a)x - (2\delta_y/b)y} \quad (5)$$

$$\begin{cases} -\frac{a}{2} + \frac{x_d}{2} \leq x \leq -\frac{a'}{2}, & -\frac{b}{2} + \frac{y_d}{2} \leq y \leq -\frac{b'}{2} & (n=1) \\ -\frac{a}{2} + \frac{x_d}{2} \leq x \leq -\frac{a'}{2}, & \frac{b'}{2} \leq y \leq \frac{b}{2} - \frac{y_d}{2} & (n=2) \\ \frac{a'}{2} \leq x \leq \frac{a}{2} - \frac{x_d}{2}, & \frac{b'}{2} \leq y \leq \frac{b}{2} - \frac{y_d}{2} & (n=3) \\ \frac{a'}{2} \leq x \leq \frac{a}{2} - \frac{x_d}{2}, & -\frac{b}{2} + \frac{y_d}{2} \leq y \leq -\frac{b'}{2} & (n=4) \end{cases}$$

In the above expression, $\delta_x=(I_4-I_1)=(I_3-I_2)$, $\delta_y=(I_3-I_4)=(I_2-I_1)$, $x_d$ and $y_d$ are the lengths of the electrode plate edge capacitor in the x-axis direction and the y-axis direction, respectively, which are reduced by the inclination, a' is the distance between the right and left electrode plates, and b' is the distance between the upper and lower electrode plates. By using this Expression (5) and the spring characteristics found by FIG. 6, it becomes possible to simulate the sensor output according to each load and the load applied position.

Next, the distributed load ratios will be defined as preparation for checking of the measurement characteristics for the uneven load and the derivation of the error compensation formula. The measured load distribution of the load sensor 20 is uniquely determined according to the applied load and its center position. By using this characteristic, the estimation and compensation of errors in the uneven load measurement become possible. Important information regarding the load distribution is the total load and the distributed load pattern. The method for deriving the total load Fa is as described earlier. The distributed load pattern will be treated as an x-axis direction distributed load ratio $R_x$ and a y-axis direction distributed load ratio $R_y$.

Definitions of $R_x$ and $R_y$ are expressed, respectively, as the following Expression (6) and the following Expression (7).

[Math. 6]

$$R_x = \frac{1}{2}\left(\frac{F_{ch4}}{F_{ch1} + F_{ch4}} + \frac{F_{ch3}}{F_{ch2} + F_{ch3}}\right) - 0.5 \quad (6)$$

[Math. 7]

$$R_y = \frac{1}{2}\left(\frac{F_{ch2}}{F_{ch1} + F_{ch2}} + \frac{F_{ch3}}{F_{ch3} + F_{ch4}}\right) - 0.5 \quad (7)$$

According to these Expression (6) and Expression (7), the value of $R_x$ becomes 0 when there is no inclination in the x-axis direction, and the value of $R_y$ becomes 0 when there is no inclination in the y-axis direction. Furthermore, since the measured load distribution of the load sensor 20 is uniquely determined according to the applied load and its load center position, the total load Fa, the x-axis direction distributed load ratio $R_x$, and the y-axis direction distributed load ratio $R_y$ are also uniquely determined in the same manner. Therefore, if a necessary error compensation amount can be derived from Fa and $R_x$, $R_y$, the error compensation becomes possible regarding the load measurement for the uneven load.

This simulation is to: increase the load of 0 to 596.7 [g] in the same manner as the actual sensor by adding 100 [g] each time when and after the load reaches 96.7 [g]; and calculate $F_a$ and $R_x$, $R_y$ when the load center is moved along the x-axis and the y-axis, respectively, from the center position of the load sensor 20.

Furthermore, a necessary error compensation amount is calculated from the difference between a true value $F_{true}$ of the applied load and $F_a$ and this necessary error compensation amount is set as a vertical axis; and $F_a$ and $R_x$ are set as the respective axes of a bottom face coordinate system when the load center is moved along the x-axis, and $F_a$ and $R_y$ are set as the respective axes of the bottom face coordinate system when the load center is moved along the y-axis, thereby plotting them on a 3-dimensional graph. An approximate curved surface which is obtained by using $F_a$ and $R_x$, $R_y$ as input variables and the error compensation amount as output with respect to data points which are plotted in this graph becomes the error compensation formula regarding the load measurement for the uneven load. Incidentally, the case where the load center is moved in both the x-axis direction and the y-axis direction simultaneously will be explained later.

(4-2-1) When Load Center is Moved Along X-Axis

Figure 10:
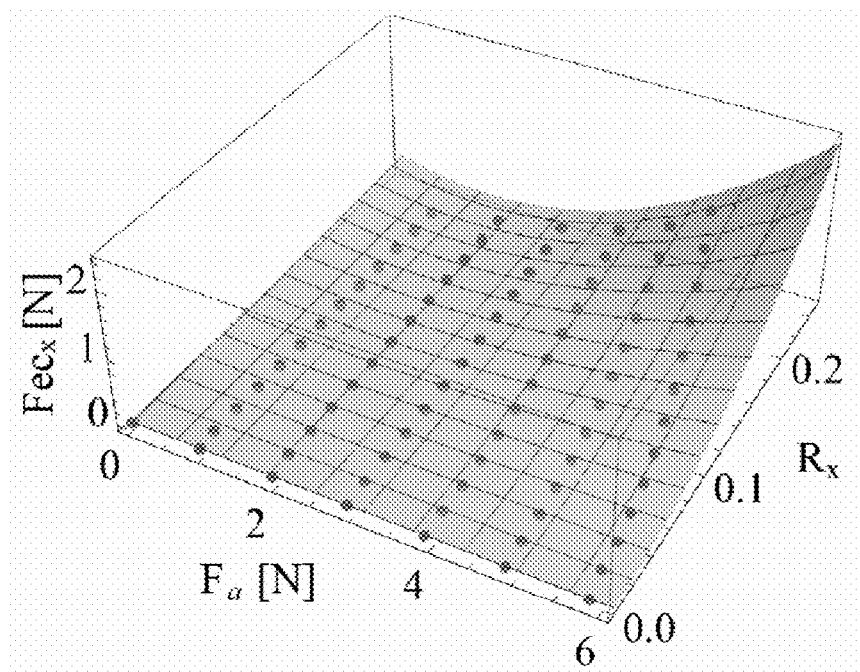
FIG. 10 is a conceptual diagram illustrating a simulation model of the load sensor when the load center is moved in a positive direction along the x-axis.

Errors of the load measurement and their compensation will be examined when the load center of the load sensor 20 is moved 1 [mm] each time from 0 [mm] to 12 [mm] in the positive direction along the x-axis. FIG. 10 illustrates a plot of data points on a 3-dimensional graph of $F_a$, $R_x$, and the error compensation amount $Fec_x$ which are calculated by the simulation. It should be noted that $Fec_x=F_{true}-F_a$.

FIG. 10 shows that the relation between $F_a$, $R_x$, and $Fec_x$ is uniquely determined according to the load and its applied position. Therefore, an approximate curved surface regarding which its input variables are $F_a$ and $R_x$ and its output is $Fec_x$ becomes the error compensation formula regarding the load measurement for the uneven load when the load center is moved in the x-axis positive direction. Under this circumstance, the error compensation is required when the inclination occurs in the upper-side electrode plate, that is, when $R_x$ is not 0; and, therefore, the function of $F_a$ will not solely influence the error compensation amount.

As a result of calculating the approximate curved surface in light of the above, high similarity was confirmed by a polynomial (8) which is quadratic for $F_a$ and quadratic for $R_x$ within the response range for the load applied this time. Incidentally, the coefficient of determination $R^2$ was 0.987.

[Math. 8]

$$Fec_x(F_a, R_x) = \quad (8)$$
$$p_1 F_a^2 R_x^2 + p_2 F_a^2 R_x + p_3 F_a R_x^2 + p_4 F_a R_x + p_5 R_x^2 + p_6 R_x + p_7$$

In the above expression, $p_n$ (n=1 to 7) is a coefficient of each term of the derived error compensation formula; and if the load center is moved in the negative direction along the x-axis, the error compensation formula is similarly calculated by separately calculating these parameters. The calculated approximate curved surface is illustrated in FIG. 10.

(4-2-2) When Load Center is Moved Along Y-Axis

Figure 11:
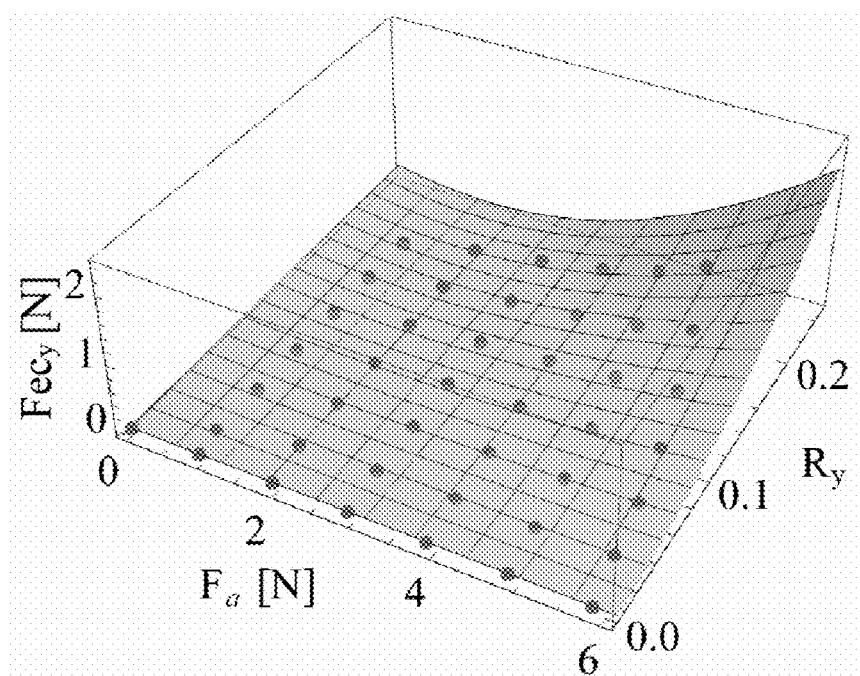
FIG. 11 is a conceptual diagram illustrating a simulation model of the load sensor when the load center is moved in a positive direction along the y-axis.

Errors of the load measurement and their compensation will be examined when the load center of the load sensor 20 is moved 1 [mm] each time from 0 [mm] to 6 [mm] in the positive direction along the y-axis. In this case, the error compensation formula can be calculated in the same manner as the case of the positive direction along the x-axis by using $R_y$ instead of $R_x$. FIG. 11 illustrates a plot of data points on a 3-dimensional graph of $F_a$, $R_y$, and the error compensation amount $Fec_y = F_{true} - F_a$, which are calculated by the simulation. Also, the calculated error compensation formula is indicated as the following Expression (9). Incidentally, the coefficient of determination $R^2$ of the approximate curved surface calculated as the error compensation formula was 0.986.

[Math. 9]

$$Fec_y(F_a, R_y) = \qquad\qquad(9)$$
$$q_1 F_a^2 R_y^2 + q_2 F_a^2 R_y + q_3 F_a R_y^2 + q_4 F_a R_y + q_5 R_y^2 + q_6 R_y + q_7$$

In the above expression, $p_n$ (n=1 to 7) is a coefficient of each term of the derived error compensation formula; and if the load center is moved in the negative direction along the y-axis, the error compensation formula is similarly calculated by separately calculating these parameters. The calculated approximate curved surface is illustrated in FIG. 11.

Referring to FIG. 10 and FIG. 11, it was confirmed by the simulation that as the load center is moved away from the center of the sensor and $R_x$ or $R_y$ and $F_a$ increase, the error compensation amount regarding the load measurement increases. Consequently, we can see that the influence caused by the material characteristics of the rubber cylinders 12 appears prominently as the measurement error(s) of the load.

(4-2-3) When Load Center is Moved in Both X-Axis and Y-Axis Directions Simultaneously Errors which remain after applying the error compensation $Fec_x$ and $Fec_y$ to the load measurement, and their compensation will be examined when the load center is moved along a diagonal line of the sensor in the positive directions of both the x-axis and the y-axis (a first quadrant) as the case where the load center of the load sensor 20 is moved in both the x-axis and y-axis directions simultaneously.

Under this circumstance, it is assumed that a residual error compensation amount is $Fec_{xy} = F_{true} - (F_a + Fec_x + Fec_y)$. Furthermore, since this is the compensation required when the load center is moved in both the x-axis and y-axis directions simultaneously, a product $R_{xy} = R_x R_y$ of the distributed load ratios in the x-axis direction and the y-axis direction is used instead of these ratios.

Figure 12:
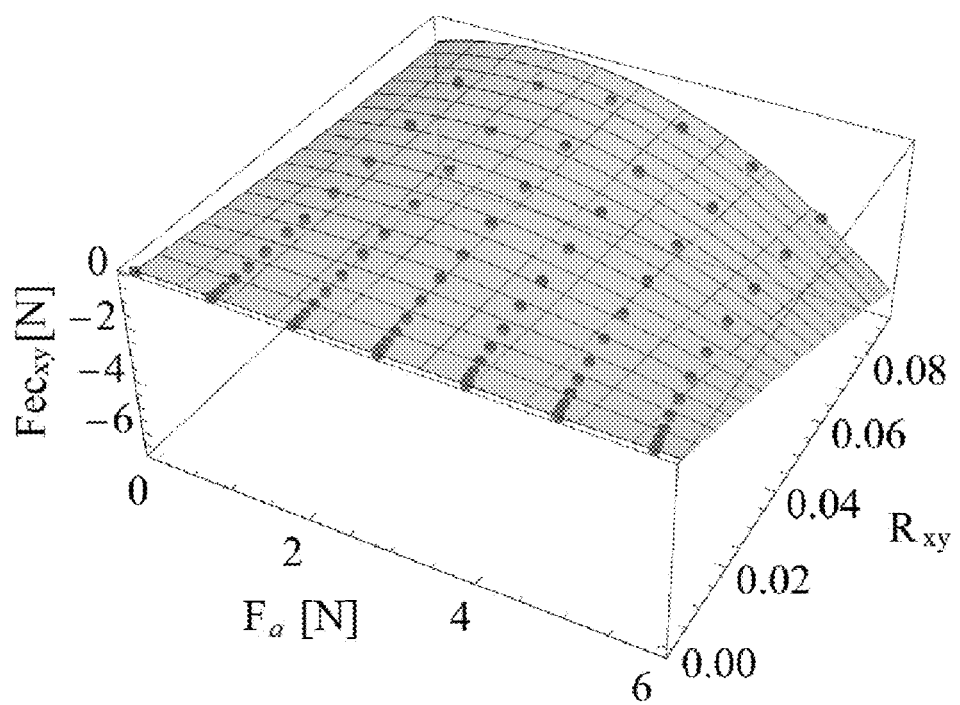
FIG. 12 is a conceptual diagram illustrating a simulation model of the load sensor when the load center is moved in both x-axis and y-axis directions simultaneously.

FIG. 12 illustrates a plot of data points on a 3-dimensional graph of $F_a$, $R_{xy}$, and $Fec_y$ calculated by the simulation. As a result of calculating the approximate curved surface, high similarity was confirmed by a polynomial (10) which is quadratic for $F_a$ and quadratic for $R_{xy}$. Incidentally, the coefficient of determination $R^2$ was 1. The obtained polynomial (10) is indicated below.

[Math. 10]

$$Fec_{xy}(F_a, R_{xy}) = \qquad\qquad(10)$$
$$r_1 F_a^2 R_{xy}^2 + r_2 F_a^2 R_{xy} + r_3 F_a R_{xy}^2 + r_4 F_a R_{xy} + r_5 R_{xy}^2 + r_6 R_{xy} + r_7$$

In the above expression, $r_n$ (n=1 to 7) is a coefficient of each term of the derived residual error compensation formula; and also when the movement of the load center is changed from the second quadrant to the fourth quadrant, the residual error compensation formula can be similarly calculated by separately calculating these parameters in each case. The calculated approximate curved surface is illustrated in FIG. 12.

Under this circumstance, the explanation has been provided about the compensation in the case where the load center is moved along the diagonal line of the sensor when $Fec_{xy}$ becomes the largest, as the case where the load center is moved in both the x-axis and y-axis directions simultaneously. In other cases, the load center becomes closer to the x-axis or the y-axis and the necessary $Fec_{xy}$ decreases. For example, when the y-coordinate of the load center becomes closer to 0, most of errors are compensated by $Fec_x$. Under this circumstance, $R_y$ becomes closer to 0 and $R_{xy}$ which is the product of $R_x$ and $R_y$ also becomes closer to 0. Since all items of $Fec_{xy}$ are the product with $R_{xy}$, $Fec_{xy}$ also becomes closer to 0. As a result, a load calculation formula for adding the compensation for the uneven load of this sensor becomes Expression (11).

[Math. 11]

$$F = F_a + Fec_x + Fec_y + Fec_{xy} \qquad\qquad(11)$$

(4-3) Derivation of Error Compensation Formula by Actual Sensor

Figure 13:
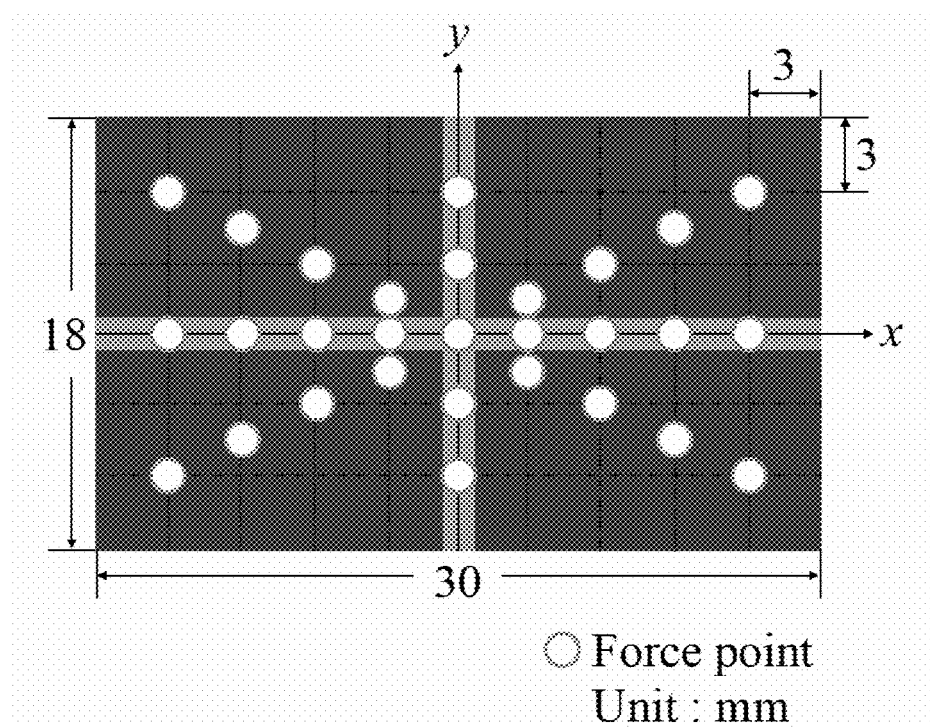
FIG. 13 is a schematic diagram indicating the relevant load applied positions in the load sensor.

The load was applied to 29 positions indicated in FIG. 13 in order to check the measurement characteristics for the uneven load in the actual sensor. It should be noted that the load of 0 to 569.7 [g] was applied by adding 100 [g] each time by using counterweights when and after the load reaches 96.7 [g] which is the weight of the load receiver of the load application apparatus.

After that, an explanation will be provided about only the results regarding the first quadrant of the load sensor 20 as a comparison with the simulation; however, various kinds of compensation formulas were applied also regarding the second quadrant to the fourth quadrant as the calibration for the uneven load measurement.

(4-3-1) When Load Center is Moved Along X-Axis

Figure 14:
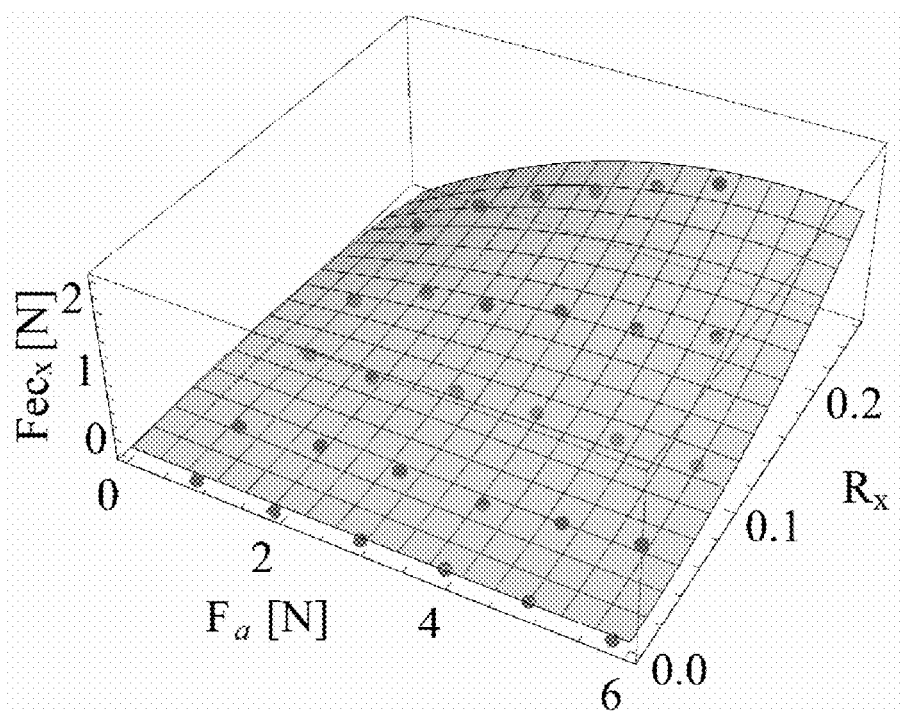
FIG. 14 is a conceptual diagram illustrating a real model of the load sensor when the load center is moved in the positive direction along the x-axis.

FIG. 14 illustrates a plot of data points on a 3-dimensional graph of $F_a$, $R_{xy}$, and $Fec_x$ of measured values when the load center of the load sensor 20 is moved 3 [mm] each time from 0 [mm] to 12 [mm] in the positive direction along the x-axis and a plot of the approximate curved surface according to the error compensation formula obtained from the simulation.

When comparing FIG. 14 with FIG. 10, there are differences in the plot of the data points when $R_x$ increases with regard to the measured values of the actual sensor; however, they have the identical characteristic that as $F_a$ and $R_x$ increase, $Fec_x$ increases; and the approximate curved surface on which the data points exist was successfully obtained by the applied error compensation formula. Incidentally, the coefficient of determination $R^2$ was 0.985.

(4-3-2) When Load Center is Moved Along Y-Axis

Figure 15:
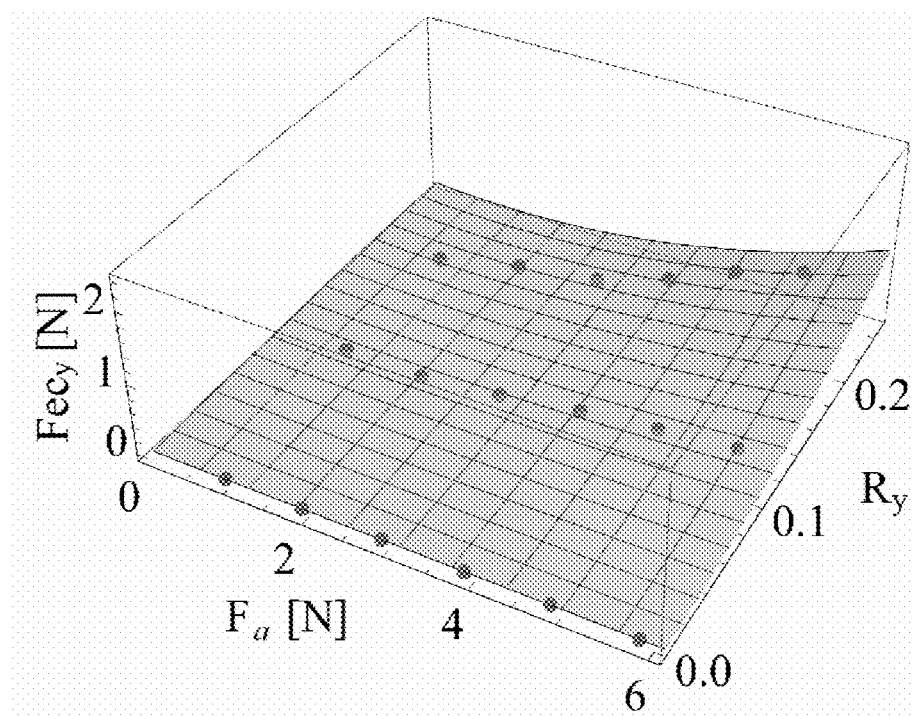
FIG. 15 is a conceptual diagram illustrating a real model of the load sensor when the load center is moved in the positive direction along the y-axis.

FIG. 15 illustrates a plot of data points on a 3-dimensional graph of $F_a$, $R_y$, and $Fec_y$ of measured values when the load center of the load sensor 20 is moved 3 [mm] each time from 0 [mm] to 6 [mm] in the positive direction along the y-axis and a plot of the approximate curved surface according to the error compensation formula obtained from the simulation.

When comparing FIG. 15 with FIG. 11, the plot of the data points is similar in a curved surface shape to that of the simulation; and the approximate curved surface on which the data points exist was successfully obtained by the applied compensation formula. Incidentally, the coefficient of determination $R^2$ was 0.979.

The reason why the size of the error compensation amount in FIG. 14 and FIG. 15 is smaller than that of the simulation is that springs were used for the simulation without consideration of the shape of the rubber cylinder(s) 12. The rubber cylinders 12 are cylinders in the real model, so that when the electrode plates are inclined due to the uneven load, the force is concentrated on an edge part of the rubber cylinder 12 whose cross-sectional area is small. Accordingly, the expansion/contraction amount of the rubber cylinder 12 becomes larger than that of the simulation and the size of the necessary error compensation amount becomes small.

As a result, the error compensation amount regarding the load measurement with the real model is kept smaller than that of the simulation due to the shape characteristics of the rubber cylinders 12. Furthermore, the difference in the characteristics from the simulation regarding a low load area when the load center is moved in the positive direction along the y-axis depends on the length of the electrode plate and is caused by an initial distortion of the second electrode plate 11, which is not considered in the simulation.

So, in order to reduce the influence by the distortion of the second electrode plate 11 and enhance the measuring accuracy, the error compensation when the load center is moved in the positive direction along the x-axis was conducted by dividing a movement section by a mean value into a section from the center of the sensor to 6 [mm] and a section from 6 [mm] or higher, thereby calculating the coefficient parameters of Expression (8) and defining the error compensation formula. Incidentally, a minimum value of the decision constant $R^2$ was 0.946.

The decision constant is lower when the error compensation formula is divided into two sections with respect to the x-coordinate of the load center; and this is because of the difference in the number of data used for the curved surface approximation and an improvement is recognized in terms of the measurement errors. In order to reduce a calculation cost for the load measurement of the load sensor 20 and enhance the measuring accuracy, it is necessary to take measures against the initial distortion of the electrode plates from now on. As one of such measures, a ceramic plate which is a light-weight insulator and has high hardness is used as a base material for the first electrode plate 10 and the second electrode plate 11.

Figure 16:
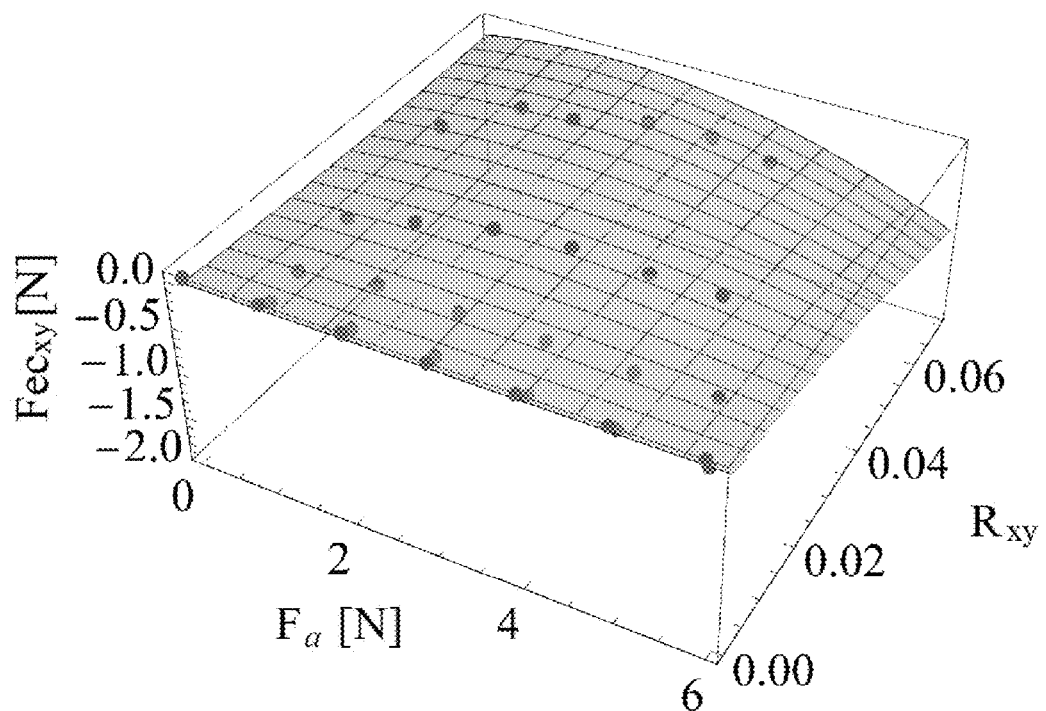
FIG. 16 is a conceptual diagram illustrating a real model of the load sensor when the load center is moved in both x-axis and y-axis directions simultaneously.

(4-3-3) When Load Center is Moved in Both X-Axis and Y-Axis Directions Simultaneously FIG. 16 illustrates a plot of the approximate curved surface according to the residual error compensation formula obtained from the simulation by plotting data points on a 3-dimensional graph of $F_a$, $R_{xy}$, and $Fec_{xy}$ of measured values when the load center of the load sensor 20 is moved along the diagonal line of the sensor in the positive directions along both the x-axis and the y-axis in the load sensor 20.

When comparing FIG. 16 with FIG. 12, it was confirmed that the plot of the data was similar in its curved surface shape to that of the simulation. However, the coefficient of determination $R^2$ of the approximate curved surface turned out to be a low result, i.e., 0.258. This is caused because the value of $Fec_{xy}$ in the entire graph is small, so that dispersion of the data points which derives from resolving power of the sensor is highly influential.

Furthermore, the initial distortion of the second electrode plate 11 which is not considered in the simulation exists. So, it was decided to: divide the movement section into a section from the center of the sensor to 6 [mm] and a section from 6 [mm] or higher with respect to the x-coordinate of the load center in the same manner as the case where the load center is moved along the x-axis; and calculate the coefficient parameters of Expression (10) and define the residual error compensation formula. As a result, the minimum value of the coefficient of determination $R^2$ was 0.524, which showed an improvement.

(5) Derivation of Load Center Position

The derivation of a load center position calculation formula and its application to the actual sensor from the simulation by means of a sensor model of the load sensor 20 will be explained as the calibration for the load center position measurement in the same manner as the error compensation regarding the load measurement for the uneven load.

(5-1) Derivation of Load Center Calculation Formula by Simulation

With the load sensor 20, the load distribution to be measured is uniquely determined according to the load applied and its load center position, so that the total load $F_a$, the x-axis direction distributed load ratio $R_x$, and the y-axis direction distributed load ratio $R_y$ are also uniquely determined in the same manner. Therefore, it becomes possible to calculate the load center position from $F_a$ and $R_x$, $R_y$. The load center position calculation formula can be derived via the simulation by replacing the error compensation amount with the load center position upon the aforementioned derivation of the error compensation formula for the load measurement.

(5-1-1) When Load Center is Moved Along X-Axis

Figure 17:
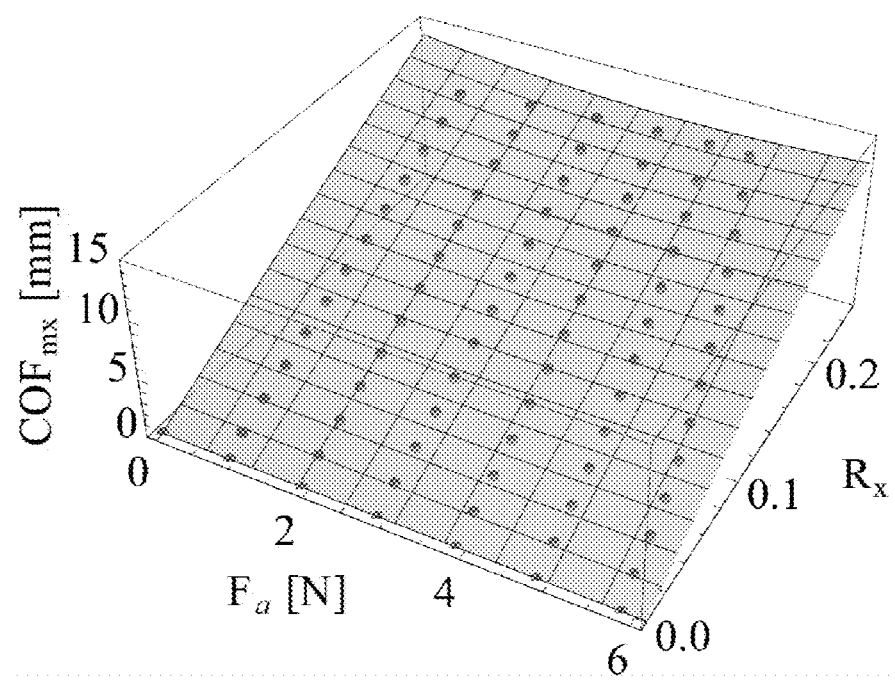
FIG. 17 is a conceptual diagram illustrating a simulation model of the load sensor when the load center is moved in the positive direction along the x-axis.

The calculation of the x-coordinate of the load center position will be examined when the load center of the load sensor 20 is moved 1 [mm] each time from 0 [mm] to 12 [mm] in the positive direction along the x-axis. FIG. 17 illustrates a plot of data points on a 3-dimensional graph of $F_a$, $R_x$, and the x-coordinate $COF_{mx}$ of the load center position which are calculated by the simulation.

Referring to FIG. 17, you can see that the relation between $F_a$, $R_x$, and $COF_{mx}$ is uniquely determined according to the load and its applied position. Therefore, an approximate curved surface regarding which its input variables are $F_a$ and $R_x$ and its output is $COF_{mx}$ becomes a formula for calculating the x-coordinate of the load center. Under this circumstance, the function of $F_a$ will not solely influence the load center position. As a result of calculating the approximate curved surface in light of the above, high similarity was confirmed by Expression (12) that is a polynomial which is quadratic for $F_a$ and quadratic for $R_x$ within the response range for the load applied this time. Incidentally, the coefficient of determination $R^2$ was 1.

[Math. 12]

$$COF_{mx}(F_a, R_x) = \\ s_1 F_a^2 R_x^2 + s_2 F_a^2 R_x + s_3 F_a R_x^2 + s_4 F_a R_x + s_5 R_x^2 + s_6 R_x + s_7 \quad (12)$$

In the above expression, sn (n=1 to 7) is a coefficient of each term of the derived error compensation formula; and if the load center is moved in the negative direction along the x-axis, $COF_{mx}$ is similarly calculated by separately calculating these parameters. The calculated approximate curved surface is illustrated in FIG. 17. Incidentally, the approximate curved surface can be also calculated with the coefficient of determination which is relatively high, by means of a polynomial which is linear for $F_a$ and is linear for $R_x$; however, according to the present invention, it was decided to adopt Expression (12) which had a higher result of the coefficient of determination in order to realize the measurement of the load center position with higher accuracy.

(5-1-2) When Load Center is Moved Along Y-Axis

The calculation of the y-coordinate of the load center position will be examined when the load center of the load sensor 20 is moved 1 [mm] each time from 0 [mm] to 6 [mm] in the positive direction along the y-axis. In this case, the formula for calculating the y-coordinate of the load center position can be obtained in the same manner as the case of the positive direction along the x-axis by using $R_y$ instead of $R_x$.

Figure 18:
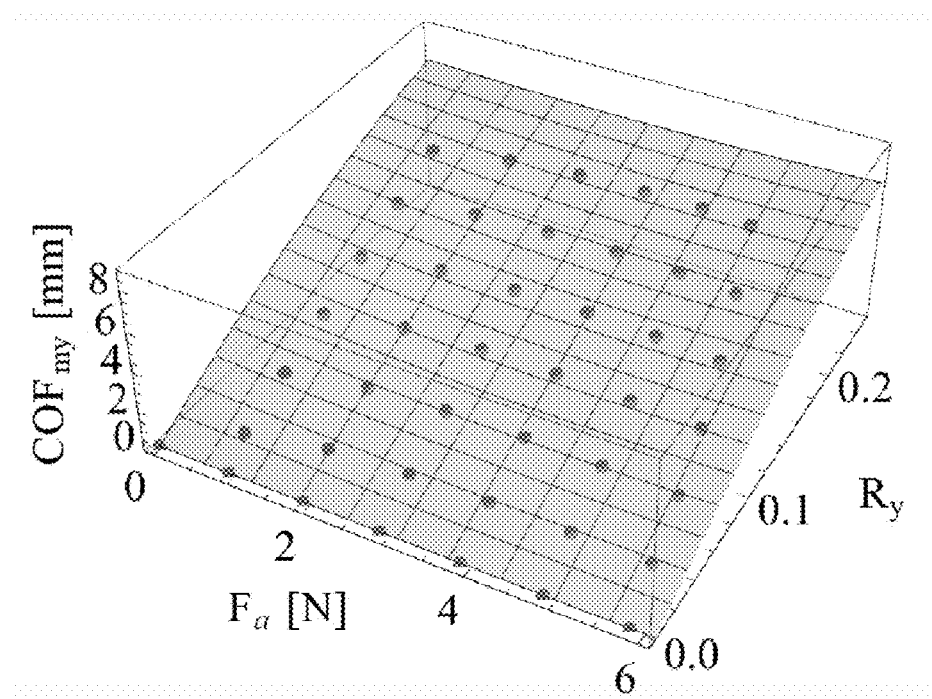
FIG. 18 is a conceptual diagram illustrating a simulation model of the load sensor when the load center is moved in the positive direction along the y-axis.

FIG. 18 illustrates a plot of data points on a 3-dimensional graph of $F_a$, $R_y$, and the error compensation amount $COF_{my}$ of the y-coordinate of the load center position which are calculated by the simulation, and the obtained calculation formula is indicated in the following Expression (13). Incidentally, the coefficient of determination $R^2$ of the approximate curved surface obtained as the calculation formula was 0.999.

[Math. 13]

$$COF_{my}(F_a, R_y) = \\ t_1 F_a^2 R_y^2 + t_2 F_a^2 R_y + t_3 F_a R_y^2 + t_4 F_a R_y + t_5 R_y^2 + t_6 R_y + t_7 \quad (13)$$

In the above expression, $t_n$ (n=1 to 7) is a coefficient of each term of the derived error compensation formula; and if the load center is moved in the negative direction along the y-axis, $COF_{my}$ is similarly calculated by separately calculating these parameters. The calculated approximate curved surface is illustrated in FIG. 18.

(5-1-3) When Load Center is Moved in Both X-Axis and Y-Axis Directions Simultaneously Assuming that the load on the load sensor 20 is moved in both the x-axis and y-axis directions simultaneously, a measurement error(s) of the load center position and its compensation will be examined when the load center is moved along a diagonal line of the sensor in the positive directions of both the x-axis and the y-axis (the first quadrant).

Under this circumstance, it is assumed that the error amount of the load center position is $COFec_{(x,y)} = COF_{true(x,y)} - COF_{m(x,y)}$. Furthermore, since this is the compensation which is required when the load center is moved in both the x-axis and y-axis directions simultaneously, a product $R_{xy}$ of the distributed load ratios in the x-axis direction and the y-axis direction is used instead of these ratios.

Figure 19:
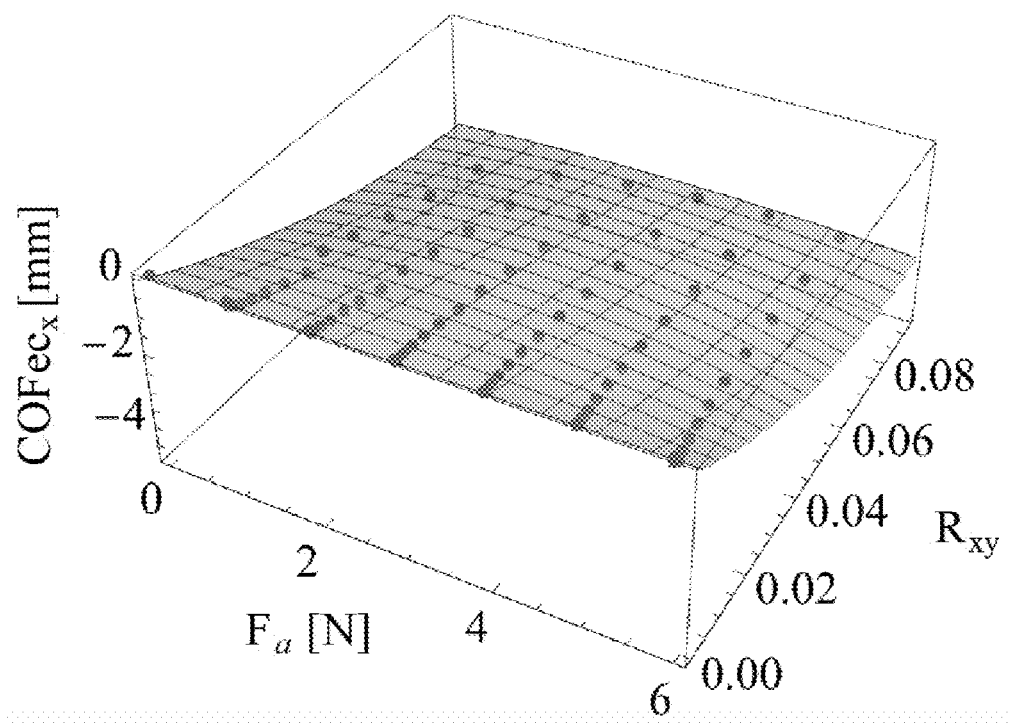
FIG. 19 is a conceptual diagram illustrating a simulation model after reflecting error compensation for the x-coordinates.
Figure 20:
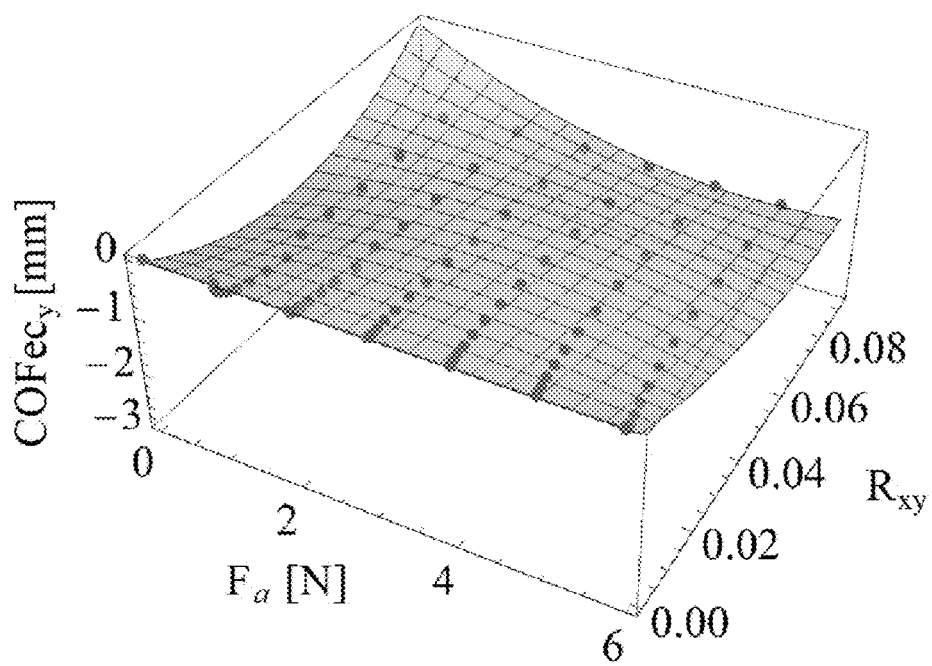
FIG. 20 is a conceptual diagram illustrating a simulation model after reflecting error compensation for the y-coordinates.

FIG. 19 illustrates a plot of data points on a 3-dimensional graph of $F_a$, $R_{xy}$, and the error compensation amount $COFec_x$ of the x-coordinate of the load center position which are calculated by the simulation; and FIG. 20 illustrates a plot of data points on a 3-dimensional graph of $F_a$, $R_{xy}$, and the error compensation amount $COFec_y$ of the y-coordinate of the load center position.

As a result of calculating the approximate curved surfaces respectively, high similarity was confirmed by polynomials (14) and (15) which are quadratic for $F_a$ and quadratic for $R_{xy}$. Incidentally, the coefficients of determination $R^2$ were 0.994 and 0.971, respectively. The obtained polynomials are indicated as the following Expressions (14) and (15).

[Math. 14]

$$COFec_x(F_a, R_{xy}) = \\ u_1 F_a^2 R_{xy}^2 + u_2 F_a^2 R_{xy} + u_3 F_a R_{xy}^2 + u_4 F_a R_{xy} + u_5 R_{xy}^2 + u_6 R_{xy} + u_7 \quad (14)$$

[Math. 15]

$$COFec_y(F_a, R_{xy}) = \\ v_1 F_a^2 R_{xy}^2 + v_2 F_a^2 R_{xy} + v_3 F_a R_{xy}^2 + v_4 F_a R_{xy} + v_5 R_{xy}^2 + v_6 R_{xy} + v_7 \quad (15)$$

In the above expression, each of $u_n$ and $v_n$ (n=1 to 7) is a coefficient of each term of the derived error compensation formula for measuring the load center position; and also when the movement of the load center is changed from the second quadrant to the fourth quadrant, the error compensation formula can be similarly calculated by separately calculating these parameters in each case. The calculated approximate curved surfaces are illustrated in FIG. 19 and FIG. 20, respectively. As a result, a formula for calculating the load center position $COF_{(x,y)}$ of the load sensor 20 is the following Expression (16).

[Math. 16]

$$COF_{(x,y)} = COF_{m(x,y)} + COFec_{(x,y)} \quad (16)$$

Figure 21:
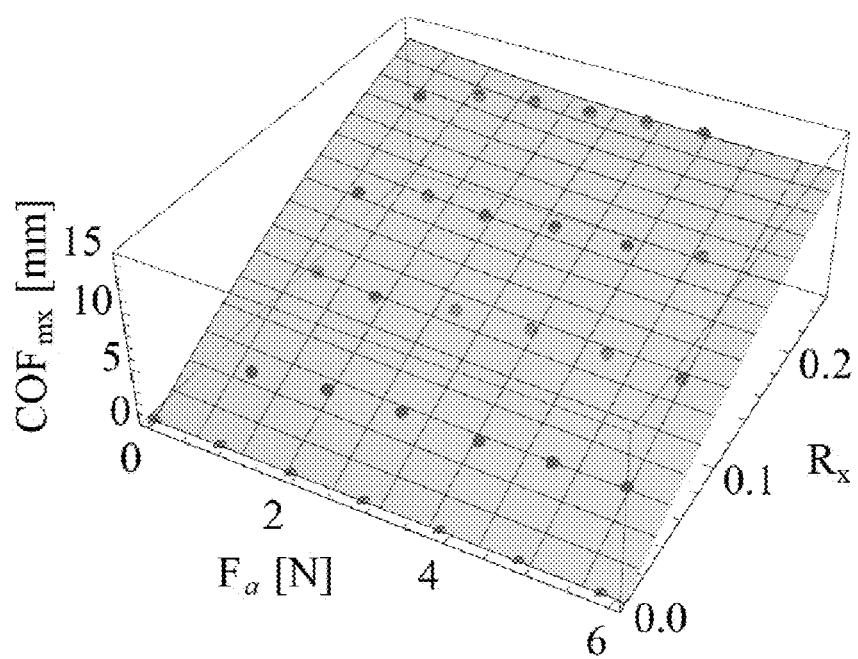
FIG. 21 is a conceptual diagram illustrating a simulation model of the load sensor when the load center is moved in the positive direction along the x-axis.

(5-2) Derivation of Load Center Calculation Formula by Actual Sensor (5-2-1) When Load Center is Moved Along X-Axis FIG. 21 is a plot of data points on a 3-dimensional graph of $F_a$, $R_x$, and $COF_{mx}$ of measured values when the load center of the load sensor 20 is moved 3 [mm] each time from 0 [mm] to 12 [mm] in the positive direction along the x-axis, and a plot of the approximate curved surface according to the $COF_{mx}$ calculation formula obtained from the simulation.

When comparing FIG. 21 with FIG. 17, the plot of the data points is similar to that of the simulation; and the approximate curved surface on which the data points exist was successfully obtained by the applied calculation formula. Incidentally, the coefficient of determination $R^2$ was 0.998.

(5-2-2) When Load Center is Moved Along Y-Axis

Figure 22:
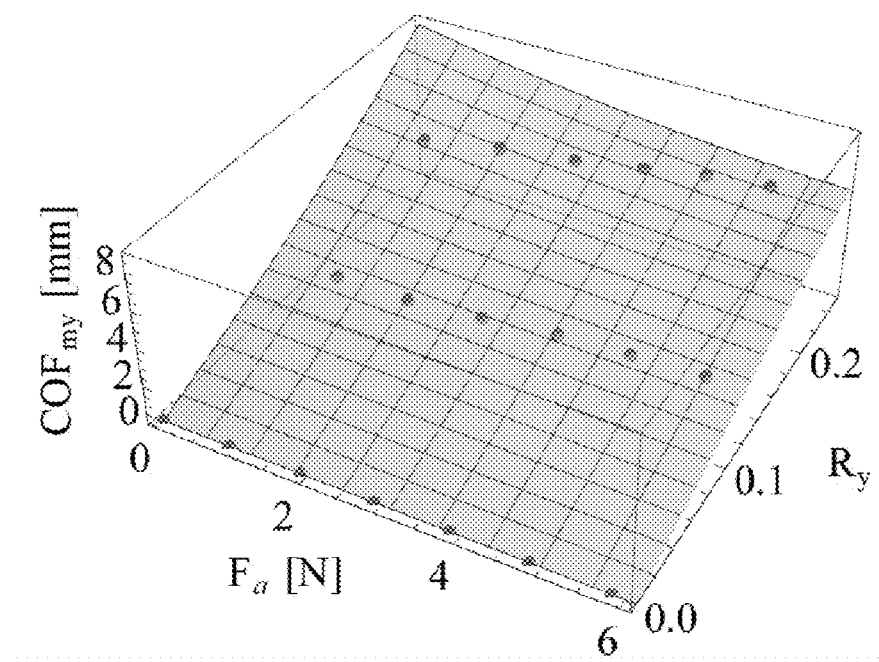
FIG. 22 is a conceptual diagram illustrating a simulation model of the load sensor when the load center is moved in the positive direction along the y-axis.

FIG. 22 is a plot of the approximate curved surface according to the $COF_{my}$ calculation formula obtained from the simulation by plotting data points on a 3-dimensional graph of $F_a$, $R_y$, and $COF_{my}$ of measured values when the load center of the load sensor 20 is moved 3 [mm] each time from 0 [mm] to 6 [mm] in the positive direction along the y-axis.

When comparing FIG. 22 with FIG. 18, the plot of the data points is similar to that of the simulation; and the approximate curved surface on which the data points exist was successfully obtained by the applied calculation formula. Incidentally, the coefficient of determination $R^2$ was 0.999.

Figure 23:
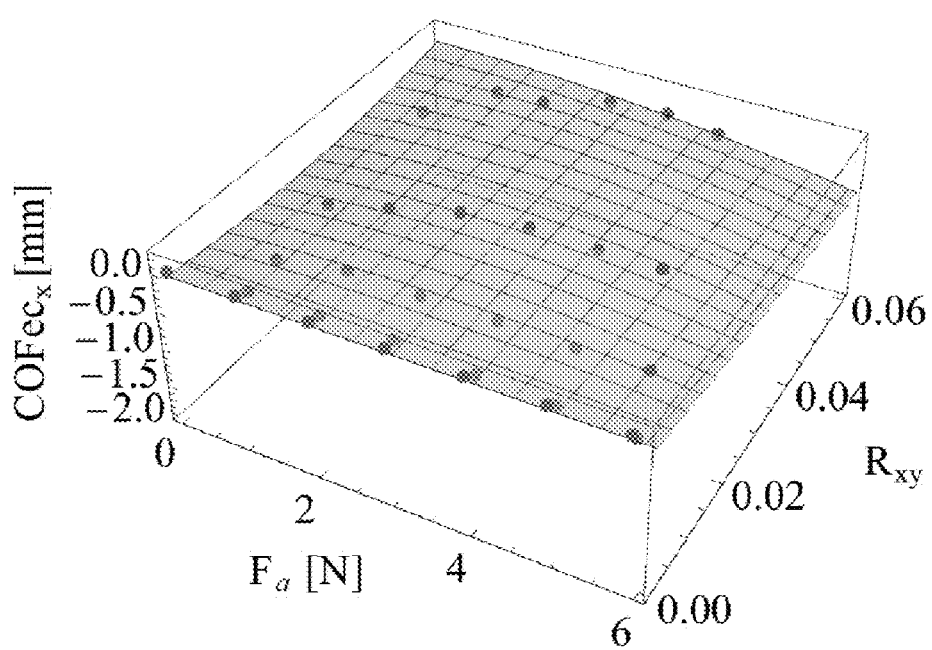
FIG. 23 is a conceptual diagram illustrating a simulation model after reflecting error compensation for the x-coordinates.
Figure 24:
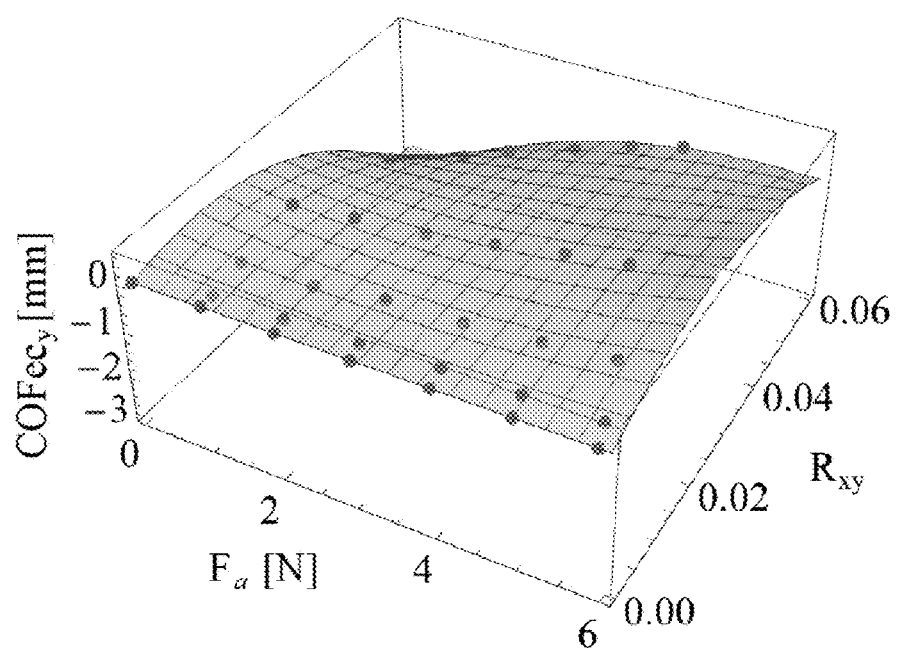
FIG. 24 is a conceptual diagram illustrating a simulation model after reflecting error compensation for the y-coordinates.

(5-2-3) When Load Center is Moved in Both X-Axis and Y-Axis Directions Simultaneously FIG. 23 and FIG. 24 illustrate plots of approximate curved surfaces according to the error compensation formula obtained by the simulation by plotting data points on a 3-dimensional graph of $F_a$, $R_{xy}$, and $COFec_{(x,y)}$ of measured values when the load center of the load sensor 20 is moved along the diagonal line of the sensor in both the x-axis and y-axis positive directions.

When comparing FIG. 23 with FIG. 19 and comparing FIG. 24 with FIG. 20, some difference in the plot of the data points was observed from that of the simulation. This is caused because the initial distortion between the electrodes, which is not considered in the simulation, is the difference from the spring model of the rubber cylinder 12; and you can see that this appeared as a large difference because the value of $COFec_{(x,y)}$ is small.

Incidentally, the coefficients of determination $R^2$ of the approximate curved surfaces were 0.290 and 0.939, respectively. The coefficient of determination of the approximate curved surface in FIG. 23 is low; and this is because the value of $COFec_x$ in the entire graph is small and, therefore, dispersion of the data points which derives from resolving power of the sensor is highly influential. On the other hand, the approximate curved surface has a high coefficient of determination relative to $COFec_y$ which has turned out to be a larger error compensation amount than $COFec_x$, so that it is effective as the error compensation formula of the load center position.

(6) Measuring Performance Evaluation Experiments

Various kinds of measuring accuracy evaluations and response checks of continuous measurement data were conducted through load application experiments in order to check whether or not the load and the load center position on the load sensor 20 can be actually measured with respect to the haptic detection apparatus 1 according to the present invention.

(6-1) Experiment Method

The load is applied to 29 positions indicated in FIG. 13 by using the load application apparatus and the measuring accuracy of the load sensor 20 is evaluated by using a measured value one second after the load application regarding which the calibration and the error compensation are conducted this time. Incidentally, the load of 0 to 596.7 [g] is applied by adding 100 g each time by using counterweights when and after the load reaches 96.7 g which is the weight of the load receiver of the load application apparatus; and five trials of the load application are conducted at each position and regarding each load.

Continuous data of various kinds of measured values are plotted in graphs when applying the load of 2.91 [N] which is an approximate mean value within the load measurement range at (x, y)=(12, 6) mm on the load sensor 20 for 10 seconds; and the response of the measurement data is checked.

(6-2) Experiment Results

Figure 25B:
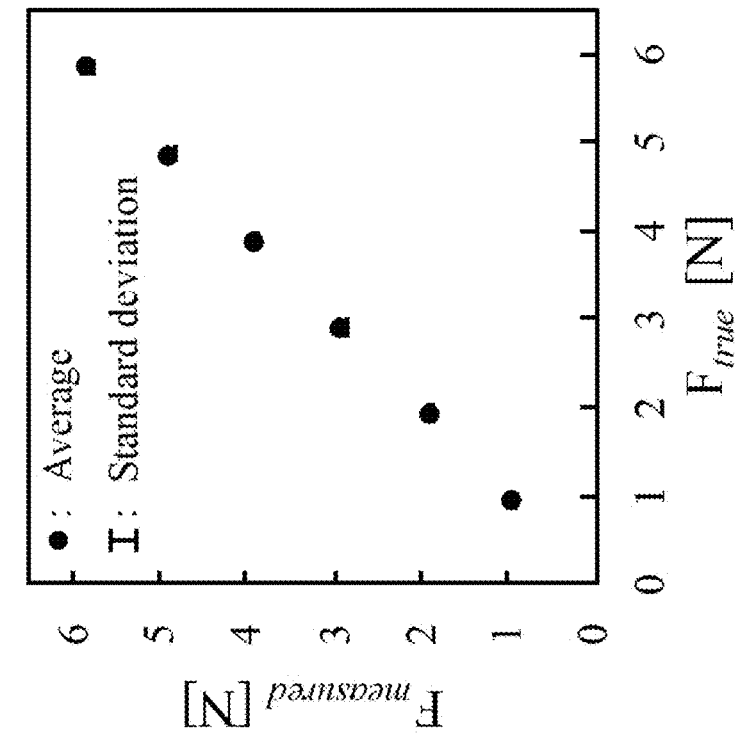
FIGS. 25A and 25B show graphs indicating load measurement results by the load sensor.
Figure 25A:
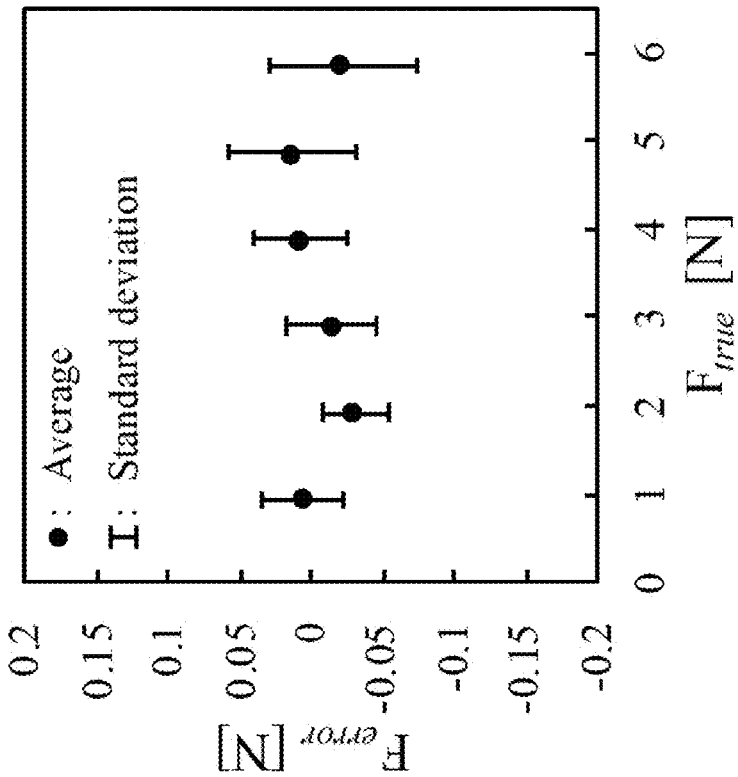

FIG. 25A and FIG. 25B show measurement results of the load by the load sensor 20. FIG. 25A shows sample averages of the measured values and FIG. 25B shows sample averages of measurement errors. According to the experiment results, it was confirmed that with the load sensor 20 according to this embodiment, the sample averages of the errors were within the range of ±0.030 [N]. Incidentally, a maximum value of a standard deviation was 0.051 [N].

Figure 26A:
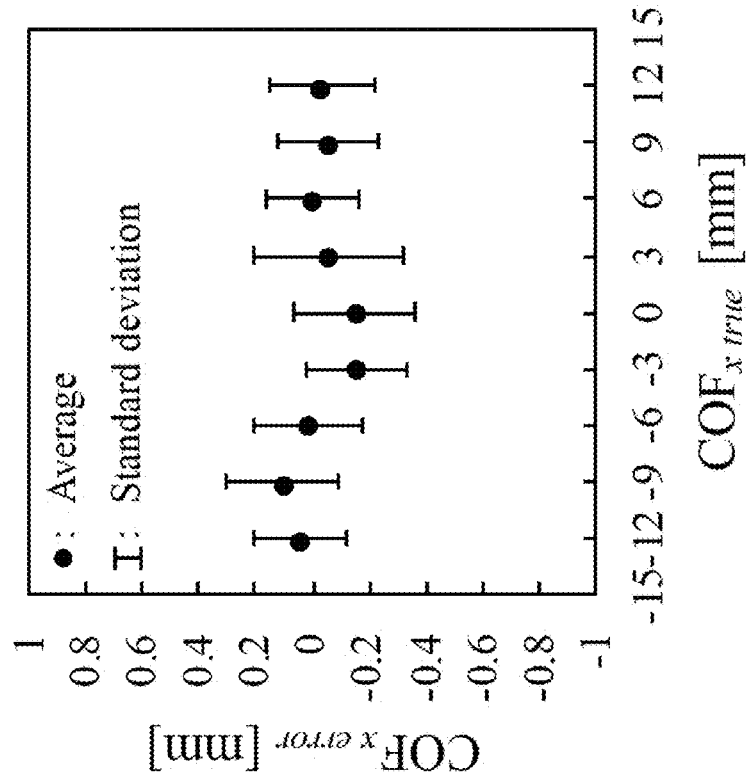
FIGS. 26A and 26B show graphs indicating measurement results of the x-coordinate at the load center position.
Figure 26B:
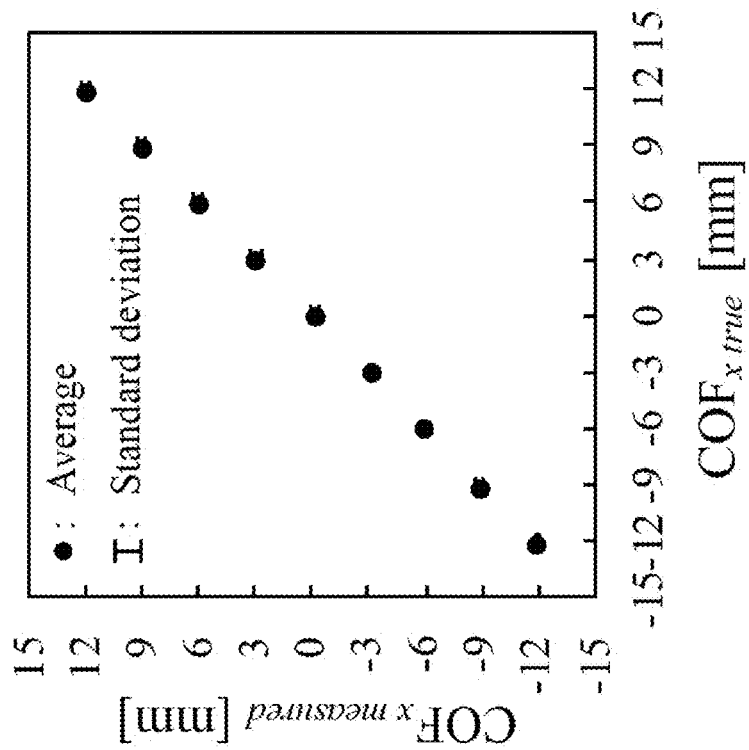
Figure 27A:
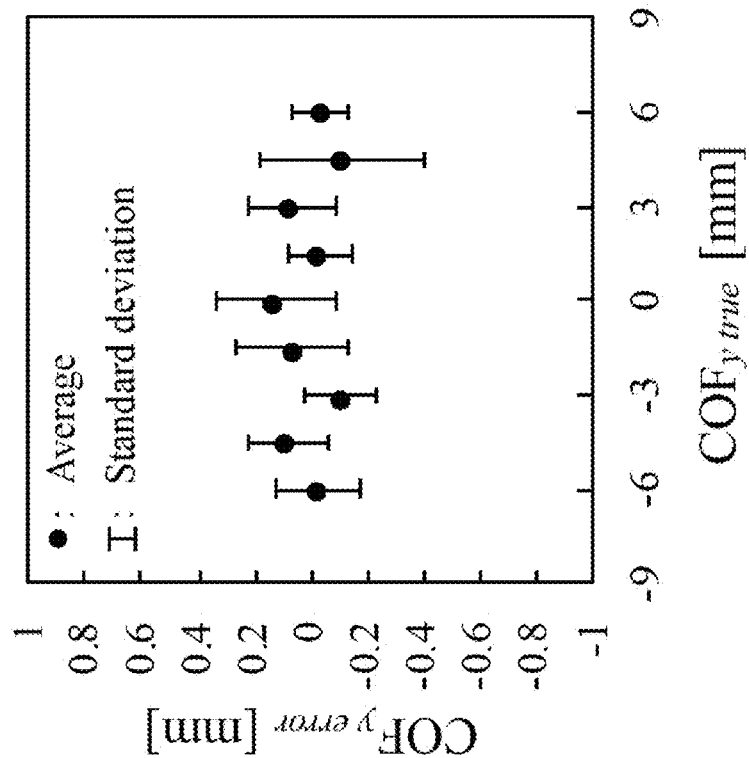
FIGS. 27A and 27B show graphs indicating measurement results of the y-coordinate at the load center position.
Figure 27B:
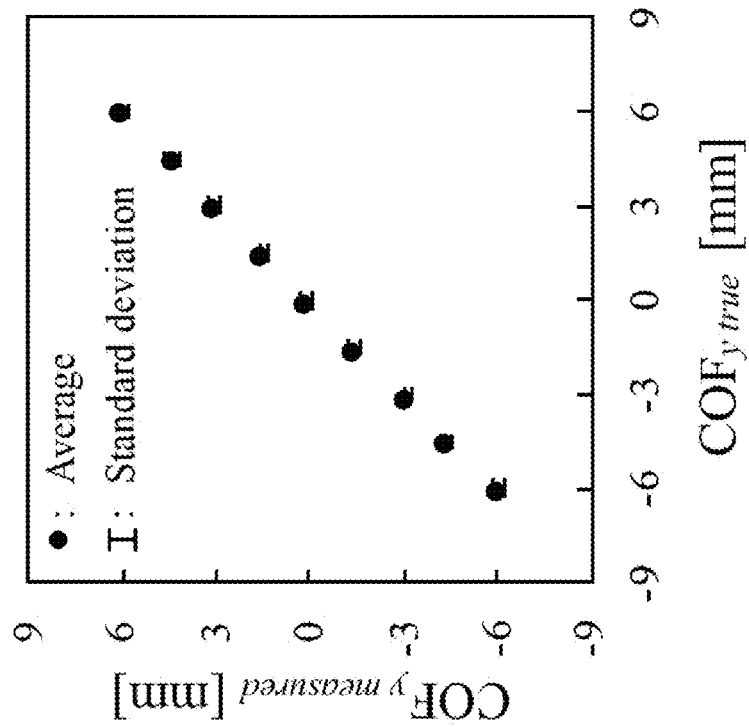

Subsequently, FIG. 26 and FIG. 27 show measurement results of the x-coordinate $COF_x$ and the y-coordinate $COF_y$ of the load center position, respectively. Referring to FIG. 26, it was confirmed that the sample averages of the measurement errors of the x-coordinate were within the range of ±0.11 [mm]. Incidentally, a maximum standard deviation was 0.27 [mm]. Referring to FIG. 27, it was confirmed that the sample averages of the measurement errors of the y-coordinate were within the range of ±0.12 [mm]. Incidentally, a maximum standard deviation was 0.29 [mm].

Figure 28A:
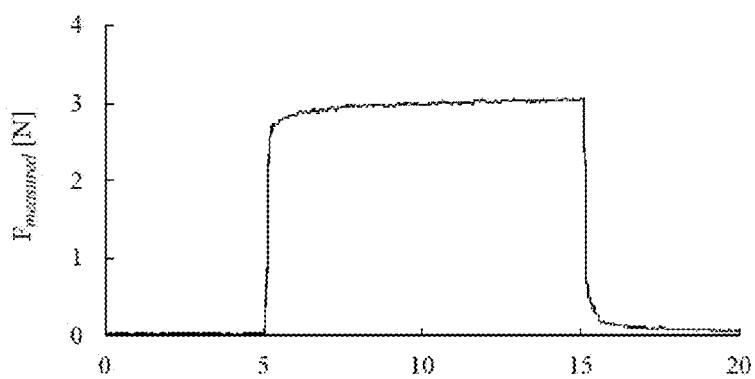
FIGS. 28A-28C show graphs indicating continuous data of various types of measured values when the load is applied to the load sensor for 10 seconds.
Figure 28B:
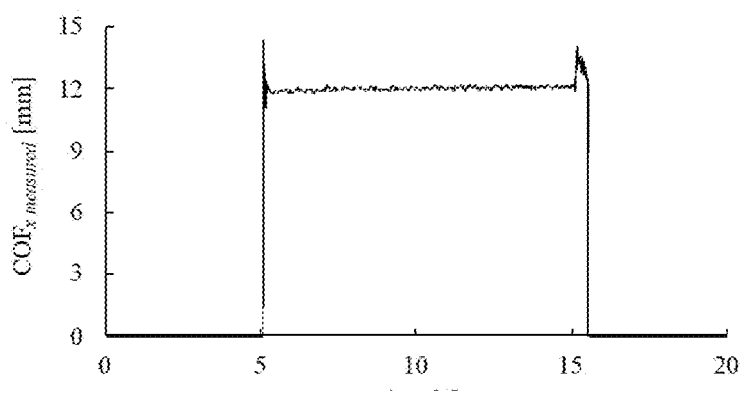
Figure 28C:
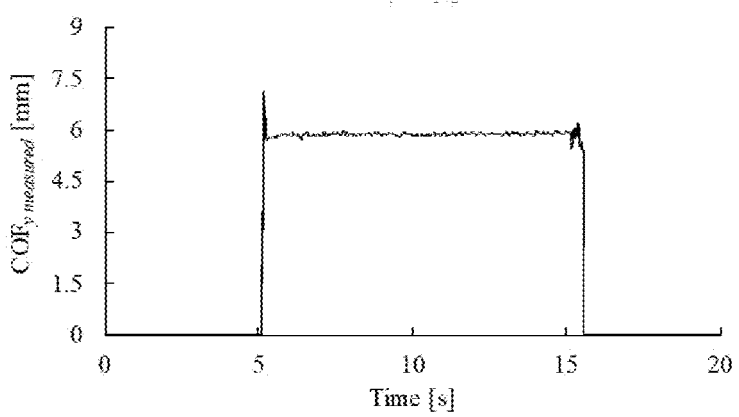

FIG. 28A to FIG. 28C show continuous data of various kinds of measured values when applying the load of 2.91 [N] to (x, y)=(12, 6) [mm] of the load sensor 20 for 10 seconds. Incidentally, regarding the load center position, the influence of the measured load errors in the load distribution appears prominently in a low load area, so that 0.196 [N] (=20 [g]) or lower is filtered. Referring to FIG. 28A to FIG. 28C, it was confirmed that the responses of the measured load and its load center position correspond to the applied load and its load center position.

(7) Actions and Advantageous Effects of Haptic Detection Apparatus 1 According to this Embodiment According to the above-described configuration, the haptic detection apparatus 1 is designed to include: the electrostatic-capacity-type load sensor 20 that forms a plurality of capacitors by inserting the same number of specified-shape cylinders, each of which is composed of a viscoelastic body, as the number of a plurality of positive electrodes of a first electrode plate 10, respectively between the first electrode plate 10 on which the plurality of positive electrodes are disposed in the same plane and in an array shape, and the second electrode plate 11 on which a single negative electrode is disposed; the capacitance detection unit 30 that detects capacitance of each of the capacitors which changes according to an external force applied to the second electrode plate 11 of the load sensor 20; the distributed load measurement unit 31 that measures a distributed load indicating a distribution of load applied to each of the rubber cylinders 12 on the basis of a change amount of the capacitance of each capacitor which is detected by the capacitance detection unit 30; and the load information calculation unit 32 that calculates a total load and a load center position of the external force applied to the second electrode plate 11 of the load sensor 20 on the basis of a relation between an expansion/contraction amount of each cylinder relative to the distributed load measured by the distributed load measurement unit 31 and a pattern of the distributed load.

As a result, the distributed load applied to each rubber cylinder 12 is uniquely determined according to the total load and the load center position of the external force applied to the second electrode plate 11 of the load sensor 20, so that the size of the externally applied load can be measured accurately regardless of the planar dimension of the load which acts on the second electrode plate 11.

Accordingly, with the haptic detection apparatus 1 according to this embodiment, it was confirmed by the aforementioned measuring accuracy evaluation experiments by the actual sensor that the load sensor 20 can actually measure the load and the load center within the required load measurement range. Under this circumstance, if attention is focused on the measurement of the load center, it was successfully confirmed that the resolution for a stimulation position on a human finger's surface is approximately 1.6 [mm] and the load sensor 20 according to this embodiment has the measuring accuracy equal to or more than this.

Moreover, as the hardness of the silicone rubber used for the rubber cylinders 12 becomes lower, the increase amount of the capacitance relative to the applied load becomes larger. Consequently, if much higher measuring accuracy is required, it is possible to adjust and enhance the resolving power by using the silicone rubber with lower hardness.

Furthermore, with the haptic detection apparatus 1, the capacitance detection unit 30 is designed, regarding each capacitor, to calibrate and correct a response lag according to a measurement error of the load applied to the rubber cylinder 12 according to material characteristics of the relevant rubber cylinder 12, and the hardness of the rubber cylinder 12 on the basis of an increase amount of the capacitance until an elapse of a specified amount of time after the application of the load.

As a result, the response lag occurs attributable to gradual plastic deformation, which occurs after instantaneous elastic deformation, of the rubber cylinder(s) 12 which is the viscoelastic body, so that: the response lag becomes larger in proportion to a low level of the hardness; and as the hardness becomes lower, the expansion/contraction amount of the rubber cylinder 12 relative to the load increases and the distance between the first electrode plate 10 and the second electrode plate 11 becomes shorter and, therefore, the capacitance which has an inverse proportion relation with the distance between the first electrode plate 10 and the second electrode plate 11 becomes larger. So, the increase amount of the capacitance becomes larger in proportion to the low level of the hardness, but such factors based on the material characteristics can be solved.

Upon actual checking of the responses of various kinds of measurement data, the response lag was confirmed regarding the measured load, but an improvement was confirmed with the response lag regarding the measured load center position. This is because components of the load division ratio are highly influential in the load center calculation formula and the influences of the response lag are offset each other in the load division ratio calculated from components of force of the measured load of each channel.

Furthermore, it was confirmed that as the hardness of the silicone rubber used for the rubber cylinder 12 is higher, the responsiveness of the sensor output becomes higher. Therefore, if great importance is attached to the responsiveness also with respect to the load measurement, we can say that the load measurement with higher responsiveness is enabled by using the silicone rubber with much higher hardness. The resolving power of the sensor and the responsiveness are in a trade-off relationship; however, by reducing the diameter or height of the rubber cylinder 12, the increase amount of the capacitance by the load application can be made larger even when using the silicone rubber with high hardness, so that the enhancement of both the resolving power and the responsiveness can be achieved.

Furthermore, with the haptic detection apparatus 1, the load information calculation unit 32 is designed to: calculate an error compensation amount for an uneven load, which causes the load center position to become outside the center of the second electrode plate 11, on the basis of the total load of the external force applied to the second electrode plate 11 of the load sensor 20, the distributed load ratio in the x-axis direction of the first electrode plate 10 as a plane surface, and the distributed load ratio in the y-axis direction of the first electrode plate 10 as the plane surface; and calibrates and corrects the load center position on the basis of the error compensation amount.

As a result, the error compensation amount can be calculated by means of simulation also with respect to the uneven load which causes the load center position to become outside the center of the second electrode plate 11, and the load center position can be calibrated and corrected at the same time as the correction of the size error of each first electrode plate.

Furthermore, with the haptic detection apparatus 1, the load sensor 20 is entirely coated with a shielding material which is made of a non-conducting material. As a result, it is possible to prevent the formation of a capacitor from the sensor itself and other dielectric substances and eliminate exogenous noise.

(8) Other Embodiments

Incidentally, this embodiment has described the case where the load sensor 20 for the haptic detection apparatus 1 is configured as the capacitance type which forms four capacitors by inserting the same number of rubber cylinders 12 as that of four positive electrodes of the first electrode plate 10, respectively, between the first electrode plate 10, on which the four positive electrodes are disposed in the same plane and in the array shape, and the second electrode plate 11 on which a single negative electrode is disposed; however, the present invention is not limited to this example and the number of positive electrodes on the first electrode plate 10 may be other than four and the first electrode plate 10 may be disposed in plurality.

Furthermore, this embodiment has described the case where the rubber cylinder(s) 12 whose material is the silicone rubber is applied as the cylinder which is composed of a viscoelastic body to be inserted between the first electrode plate 10 and the second electrode plate 11; however, the present invention is not limited to this example and any materials other than the silicone rubber may be applied as long as such materials have excellent weather resistance, heat resistance, and cold resistance and have the hardness capable of securing a specified level or higher level of the responsiveness of the sensor output of the load sensor 20. If the enhancement of both the sensor's resolving power and responsiveness can be achieved, the present invention may be applied to a wide variety of materials other than those of the rubber cylinder 12.

Furthermore, a robot arm may be configured by incorporating the haptic detection apparatus 1 according to this embodiment into fingertips for holding an object so that the second electrode plate 11 of the load sensor 20 serves as a holding surface of the fingertips for holding the object. Adjustments of the resolving power and the responsiveness can be realized by designing the size of the load sensor 20 by assuming the incorporation of the load sensor 20 into the finger part of the robot arm and adjusting the hardness and shape of the rubber cylinder(s) 12, so that it is expected to be utilized as a haptic sense of a robot for supporting human life. Furthermore, when this robot arm holds the object, it becomes possible to accurately recognize a contact pressure and contact positions at the fingertips.

REFERENCE SIGNS LIST

1: haptic detection apparatus
10: first electrode plate

11: second electrode plate
12: rubber cylinder
20: load sensor
30: capacitance detection unit
31: distributed load measurement unit
32: load information calculation unit
40: load application apparatus
41: receiver
42: active link mechanism unit
43: outer shell guide
44: sensor cover

The invention claimed is:

1. A load sensor for haptic detection, the load sensor comprising:
   a plurality of viscoelastic bodies;
   a first electrode plate including a plurality of positive electrodes;
   a second electrode plate; and
   a plurality of capacitors, wherein the plurality of capacitors are inserted in a same number of specified-shape cylinders, each of which is composed of one of the plurality of viscoelastic bodies, as a number of the plurality of positive electrodes, respectively between the first electrode plate on which the plurality of positive electrodes are disposed in a same plane and in an array shape, and the second electrode plate on which a single negative electrode is disposed,
   wherein the load sensor is configured to:
   detect capacitance of each of the capacitors which changes according to an external force applied to the second electrode plate of the load sensor,
   measure a distributed load indicating a distribution of a load applied to each of the specified-shape cylinders based on a change amount of the capacitance of each,
   calculate a total load and a load center position of the external force applied to the second electrode plate of the load sensor based on a relation between an expansion/contraction amount of each cylinder relative to the distributed load measured and a pattern of the distributed load, and
   calculate an error compensation amount for an uneven load, which causes the load center position to become outside a center of the second electrode plate, based on of the total load of the external force applied to the second electrode plate of the load sensor, a ratio of the distributed load in an x-axis direction of the first electrode plate as a plane surface, and a ratio of the distributed load in a y-axis direction of the first electrode plate as the plane surface and calibrates and corrects the load center position based on the error compensation amount.

2. The load sensor according to claim 1,
   wherein, for each of the plurality of capacitors, the sensor calibrates and corrects a response lag according to a measurement error of the load applied to a relevant cylinder of the specified-shape cylinders according to material characteristics of the relevant cylinder, and hardness of the relevant cylinder based on an increase amount of the capacitance until an elapse of a specified amount of time after the load applied.

3. The load sensor according to claim 1,
   wherein the load sensor is entirely coated with a shielding material which is made of a non-conducting material.

4. A robot arm including fingertips comprising the load sensor according to claim 1 incorporated into the fingertips for holding an object so that the second electrode plate of the load sensor becomes a holding surface of the fingertips.

5. A haptic detection method with a capacitance-type load sensor configured to form a plurality of capacitors by inserting a same number of specified-shape cylinders, each of which is composed of a viscoelastic body, as the number of a plurality of positive electrodes of a first electrode plate, respectively between the first electrode plate on which the plurality of positive electrodes are disposed in a same plane and in an array shape, and a second electrode plate on which a single negative electrode is disposed,
   the haptic detection method comprising:
   a first step of detecting capacitance of each of the capacitors which changes according to an external force applied to the second electrode plate of the capacitance-type load sensor;
   a second step of measuring a distributed load indicating a distribution of a load applied to each of the specified-shape cylinders based on a change amount of the capacitance of each capacitor which is detected in the first step; and
   a third step of calculating a total load and a load center position of the external force applied to the second electrode plate of the capacitance-type load sensor based on a relation between an expansion/contraction amount of each cylinder relative to the distributed load measured in the second step and a pattern of the distributed load, and
   wherein in the third step, an error compensation amount for an uneven load, which causes the load center position to become outside a center of the second electrode plate, is calculated based on the total load of the external force applied to the second electrode plate of the capacitance-type load sensor, a ratio of the distributed load in an x-axis direction of the first electrode plate as a plane surface, and a ratio of the distributed load in a y-axis direction of the first electrode plate as the plane surface and the load center position is calibrated and corrected based on the error compensation amount.

6. The haptic detection method according to claim 5,
   wherein in the first step, regarding each capacitor, a response lag is calibrated and corrected according to a measurement error of the load applied to a relevant cylinder of the specified-shape cylinders according to material characteristics of the relevant cylinder, and hardness of the relevant cylinder on the basis of an increase amount of the capacitance until an elapse of a specified amount of time after the load applied.

7. The haptic detection method according to claim 5,
   wherein the capacitance-type load sensor is entirely coated with a shielding material which is made of a non-conducting material.

* * * * *